US012711918B2

(12) United States Patent
Park et al.

(10) Patent No.: US 12,711,918 B2
(45) Date of Patent: Aug. 18, 2026

(54) PIXEL, DISPLAY DEVICE, AND ELECTRONIC DEVICE

(71) Applicant: Samsung Display Co., Ltd., Yongin-si (KR)

(72) Inventors: Jun Hyun Park, Yongin-si (KR); Sun Kwun Son, Yongin-si (KR); Cheol Gon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/205,452

(22) Filed: May 12, 2025

(65) Prior Publication Data

US 2025/0391361 A1 Dec. 25, 2025

(30) Foreign Application Priority Data

Jun. 19, 2024 (KR) ........................ 10-2024-0079277
Nov. 11, 2024 (KR) ........................ 10-2024-0159430

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2330/021* (2013.01)

(58) Field of Classification Search
CPC ... G09G 2300/0819; G09G 2300/0842; G09G 2300/0861; G09G 2310/0286; G09G 2310/08; G09G 2330/021
USPC .................................................. 345/204–214
See application file for complete search history.

(56) References Cited

U.S. PATENT DOCUMENTS

| | | | | |
|---|---|---|---|---|
| 11,508,309 B2 * | 11/2022 | Lin | ...................... | G09G 3/3266 |
| 2007/0124633 A1 * | 5/2007 | Kim | ...................... | G09G 3/3266 714/726 |
| 2017/0154572 A1 * | 6/2017 | Kim | ...................... | G09G 3/3266 |
| 2021/0027696 A1 * | 1/2021 | Kim | ...................... | G09G 3/3233 |
| 2022/0366852 A1 * | 11/2022 | Jeong | ...................... | G09G 3/3233 |
| 2024/0347007 A1 * | 10/2024 | Byun | ...................... | G09G 3/3266 |
| 2025/0279065 A1 * | 9/2025 | Choi | ...................... | G09G 3/3266 |

FOREIGN PATENT DOCUMENTS

| | | | | |
|---|---|---|---|---|
| KR | 102091485 B1 * | 3/2020 | ........... | G09G 3/3291 |
| WO | WO-2020186933 A1 * | 9/2020 | ........... | G09G 3/3208 |

* cited by examiner

*Primary Examiner* — Kwin Xie
(74) *Attorney, Agent, or Firm* — Womble Bond Dickinson (US) LLP

(57) ABSTRACT

A display device includes pixels including a first transistor for controlling driving current based on data voltage, a second transistor for receiving the data voltage and a first scan signal having a turn-on level, a first emission transistor between a first power line and the first transistor, and including a gate electrode for receiving a first emission signal, and a second emission transistor between the first transistor and a light-emitting element, and including a gate electrode for receiving a second emission signal, during an address scan period in which the first scan signal having a turn-on level is received, the first and second emission transistors being turned off once or more, and during a self-scan period in which the first scan signal having a turn-off level is maintained, the first or second emission transistor being turned off once or more, with the other maintaining a turn-on state.

20 Claims, 21 Drawing Sheets

<ASa>

<SSb>

<SSc>

<SSd>

<SSf>

<SSg>

<SSh>

PIXEL, DISPLAY DEVICE, AND ELECTRONIC DEVICE

CROSS-REFERENCE TO RELATED APPLICATION

The present application claims priority to, and the benefit of, Korean Patent Application No. 10-2024-0079277, filed on Jun. 19, 2024, in the Korean Intellectual Office, and Korean Patent Application No. 10-2024-0159430, filed on Nov. 11, 2024, in the Korean Intellectual Property Office, the entire disclosures of which are incorporated herein by reference.

BACKGROUND

1. Field

The disclosure generally relates to a pixel, a display device, and an electronic device.

2. Description of the Related Art

With the development of information technologies, the importance of a display device which is a connection medium between a user and information increases. Accordingly, display devices, such as a liquid crystal display device and an organic light-emitting display device, are increasingly used.

A display device includes a plurality of pixels for displaying an image. Also, the display device may include a scan driver, an emission driver, and the like, which are used to control the pixels. Clock signals are suitable to control the scan driver and the emission driver, and suitable power consumption may increase as the number of clock signals becomes larger.

SUMMARY

Embodiments provide a pixel, a display device, and an electronic device, in which the number of suitable clock signals can be reduced or minimized.

In accordance with an aspect of the disclosure, there is provided a display device including pixels including a light-emitting element configured to emit light based on a driving current, a first transistor configured to control an amount of the driving current, based on a data voltage, a second transistor configured to receive the data voltage from a data line, and to receive a first scan signal having a turn-on level, a first emission transistor connected between a first power line and the first transistor, and including a gate electrode for receiving a first emission signal, and a second emission transistor connected between the first transistor and the light-emitting element, and including a gate electrode for receiving a second emission signal, wherein the first emission transistor and the second emission transistor are configured to be turned off once or more, and the second transistor is configured to receive the first scan signal having a turn-on level, during an address scan period, and wherein the first scan signal having a turn-off level is maintained, one of the first emission transistor or the second emission transistor is configured to be turned off once or more, and another of the first emission transistor or the second emission transistor is configured to maintain a turn-on state, during a self-scan period.

A waveform of the first emission signal during the address scan period, and a waveform of the first emission signal during the self-scan period, may be different, wherein a waveform of the second emission signal during the address scan period, and a waveform of the second emission signal during the self-scan period, may be different.

A time length for which supply of the driving current to the light-emitting element is suspended during the address scan period may be equal to a time length for which supply of the driving current to the light-emitting element is suspended during the self-scan period.

The pixels may further include an initialization transistor connected between an initialization voltage line and an anode electrode of the light-emitting element, and including a gate electrode for receiving a second scan signal.

A waveform of the second scan signal during the address scan period, and a waveform of the second scan signal during the self-scan period, may be the same.

The pixels may further include a reference transistor connected between a reference voltage line and a gate electrode of the first transistor, and including a gate electrode for receiving a third scan signal.

A waveform of the third scan signal during the address scan period, and a waveform of the third scan signal during the self-scan period, may be different.

A turn-on level of the first emission signal may be maintained, and the second emission signal may include a pulse of a turn-off level, during the self-scan period.

The display device may further include a first emission driver configured to provide the first emission signal, a second emission driver configured to provide the second emission signal, a first scan driver configured to provide the first scan signal, a second scan driver configured to provide the second scan signal, and a third scan driver configured to provide the third scan signal, wherein the first emission driver and the third scan driver share same clock signals of a first group.

The second emission driver and the second scan driver may share same clock signals of a second group.

The clock signals of the first group and the clock signals of the second group may be different.

The first emission signal may include a pulse of a turn-off level, and a turn-on level of the second emission signal is maintained, during the self-scan period.

The display device may further include a first emission driver configured to provide the first emission signal, a second emission driver configured to provide the second emission signal, a first scan driver configured to provide the first scan signal, a second scan driver configured to provide the second scan signal, and a third scan driver configured to provide the third scan signal, wherein the first emission driver and the second scan driver share same clock signals of a first group.

The second emission driver and the third scan driver may share same clock signals of a second group.

The clock signals of the first group and the clock signals of the second group may be different.

In accordance with another aspect of the disclosure, there is provided an electronic device including a processor configured to provide an input frame, a data driver configured to generate data voltages using grayscales for the input frame, and pixels configured to display an image using the data voltages, the pixels including a light-emitting element configured to emit light based on a driving current, a first transistor configured to control an amount of the driving current, based on a data voltage, a second transistor configured to receive the data voltage from a data line, and to receive a first scan signal having a turn-on level, a first emission transistor connected between a first power line and the first transistor, and including a gate electrode for receiving a first emission signal, and a second emission transistor connected between the first transistor and the light-emitting element, and including a gate electrode for receiving a second emission signal, wherein the first emission transistor and the second emission transistor are configured to be turned off once or more during an address scan period in which the first scan signal having a turn-on level is received, and wherein one of the first emission transistor or the second emission transistor is configured to be turned off once or more, and another of the first emission transistor or the second emission transistor is configured to maintain a turn-on state, during a self-scan period in which the first scan signal having a turn-off level is maintained.

A waveform of the first emission signal during the address scan period, and a waveform of the first emission signal during the self-scan period, may be different, wherein a waveform of the second emission signal during the address scan period, and a waveform of the second emission signal during the self-scan period, are different.

A time length for which supply of the driving current to the light-emitting element is suspended during the address scan period may be equal to a time length for which supply of the driving current to the light-emitting element is suspended during the self-scan period.

The pixels may further include an initialization transistor connected between an initialization voltage line and an anode electrode of the light-emitting element, and including a gate electrode for receiving a second scan signal, wherein a waveform of the second scan signal during the address scan period, and a waveform of the second scan signal during the self-scan period, may be the same.

The pixels may further include a reference transistor connected between a reference voltage line and a gate electrode of the first transistor, and including a gate electrode for receiving a third scan signal, wherein a waveform of the third scan signal during the address scan period, and a waveform of the third scan signal during the self-scan period, are different.

BRIEF DESCRIPTION OF THE DRAWINGS

Embodiments will now be described more fully hereinafter with reference to the accompanying drawings. However, the embodiments may be embodied in different forms, and should not be construed as limited to the embodiments set forth herein. Rather, these embodiments are provided so that this disclosure will be thorough and complete, and will fully convey the scope of the disclosed embodiments to those skilled in the art.

In the drawing figures, dimensions may be exaggerated for clarity of illustration. It will be understood that, in case that an element is referred to as being "between" two elements, it can be the only element between the two elements, or one or more intervening elements may also be present. Like reference numerals refer to like elements throughout.

DETAILED DESCRIPTION

Figure 1:
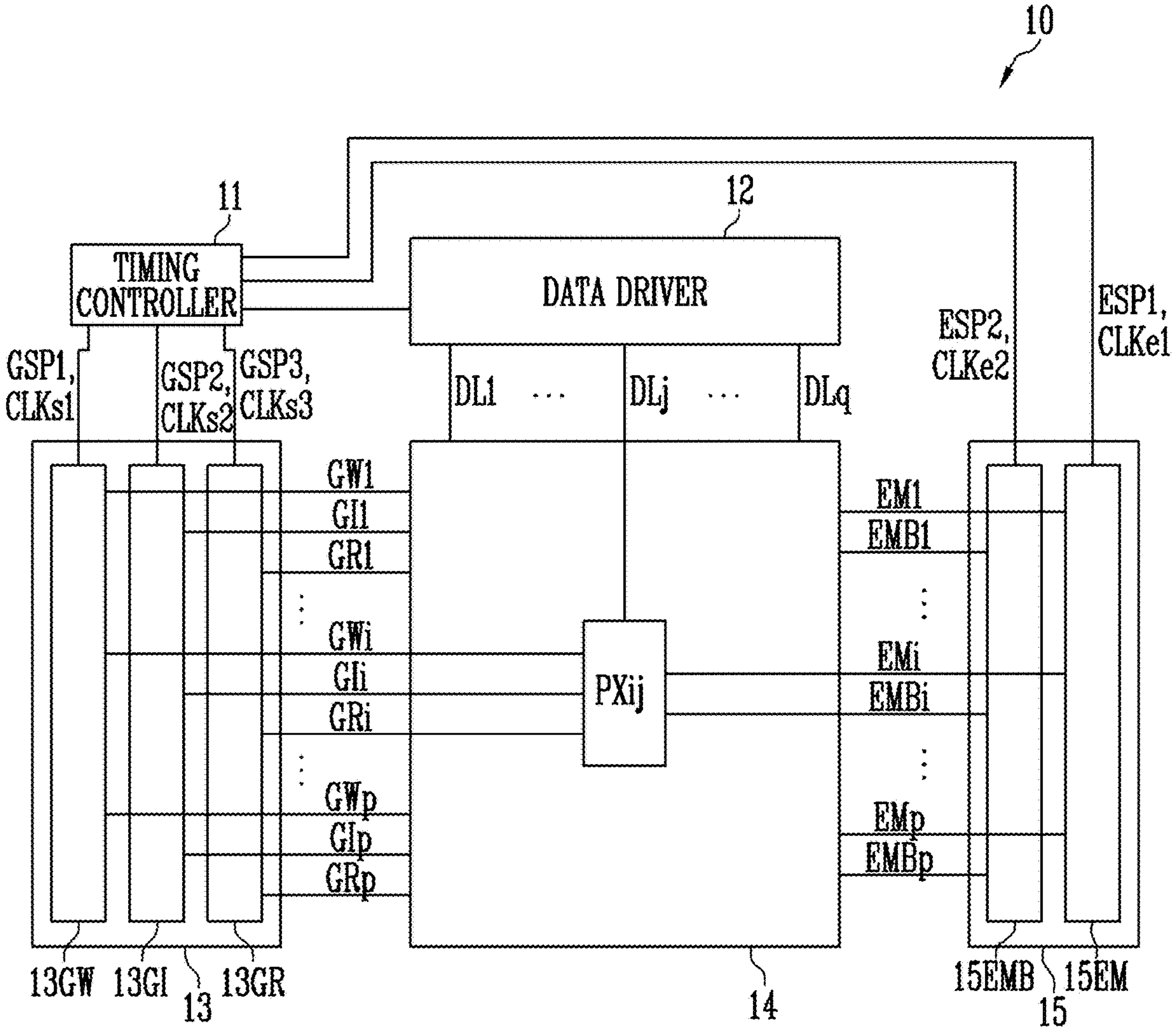
FIG. 1 is a diagram illustrating a display device in accordance with one or more embodiments of the disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more embodiments corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device in accordance with one or more embodiments of the disclosure.

Referring to FIG. 1, a display device 10 in accordance with one or more embodiments of the disclosure may include a timing controller 11, a data driver 12, a scan driver 13, a pixel unit 14, and an emission driver 15.

The timing controller 11 may receive grayscales for an input image (or an input frame). The grayscales may include a first color grayscale, a second color grayscale, and a third color grayscale. The first color grayscale may be a grayscale for expressing a first color, the second color grayscale may be a grayscale for expressing a second color, and the third color grayscale may be a grayscale for expressing a third color.

Also, the timing controller 11 may receive a control signal for an image. The control signal may include a horizontal synchronization signal Hsync, a vertical synchronization signal Vsync, and a data enable signal. The vertical synchronization signal may include a plurality of pulses, and indicate that a previous frame period is ended and a current frame period is started with respect to a time point at which each of the pulses is generated. An interval between adjacent pulses of the vertical synchronization signal may correspond to a frame period. The horizontal synchronization signal may include a plurality of pulses, and indicate that a previous horizontal period is ended and a new horizontal period is started with respect to a time point at which each of the pulses is generated. An interval between adjacent pulses of the horizontal synchronization signal may correspond to a horizontal period. The data enable signal may have an enable level with respect to corresponding horizontal periods and have a disable level in remaining periods. If the data enable signal is at the enable level, color grayscales may be supplied in corresponding periods.

The timing controller 11 may provide the data driver 12 with grayscales rendered or corrected to be suitable for specifications of the display device 10, using the grayscales for the input frame. In some embodiments, the timing controller 11 may provide the data driver 12 with grayscales which are not particularly corrected. Also, the timing controller 11 may provide the scan driver 13 with clock signals CLKs1, CLKs2, and CLKs3, scan start signals GSP1, GSP2, and GSP3, and the like. The timing controller 11 may provide the emission driver 15 with clock signals CLKe1 and CLKe2, emission stop signals ESP1 and ESP2, and the like.

The data driver 12 may generate data voltages to be provided to data lines DL1, . . . , DLj, . . . , and DLq, using grayscales and control signals, which are received from the timing controller 11. For example, the data driver 12 may sample grayscales, using a clock signal, and apply data voltages corresponding to the grayscales to the data lines DL1 to DLq in units of pixel rows. Here, q may be an integer greater than 1, and j may be an integer greater than 0 and less than q.

The scan driver 13 may include first to third scan drivers 13GW, 13GI, and 13GR. The first scan driver 13GW may provide first scan signals to first scan lines GW1, . . . , GWi, . . . , and GWp. Here, p may be an integer greater than 1, and i may be an integer greater than 0 and less than p. The second scan driver 13GI may provide second scan signals to second scan lines GI1, . . . , GIi, . . . , and GIp. The third scan driver 13GR may provide third scan signals to third scan lines GR1, . . . , GRi, . . . , GRp.

For example, the first scan driver 13GW may generate the first scan signals to be supplied to the first scan lines GW1 to GWp by receiving at least one clock signal CLKs1 and a first scan start signal GSP1 from the timing controller 11. The first scan driver 13GW may sequentially provide the first scan signals having a pulse of a turn-on level to the first scan lines GW1 to GWp. For example, the first scan driver 13GW may be configured in the form of shift registers, and generate the first scan signals in a manner that sequentially transfers the first scan start signal GSP1 in the form of a pulse of a turn-on level to a next scan stage under the control of the clock signal CLKs1.

The second scan driver 13GI may generate the second scan signals to be supplied to the second scan lines GI1 to GIp by receiving at least one clock signal CLKs2 and a second scan start signal GSP2 from the timing controller 11. The third scan driver 13GR may generate the third scan signals to be supplied to the third scan lines GR1 to GRp by receiving at least one clock signal CLKs3 and a third scan start signal GSP3 from the timing controller 11. The second scan driver 13GI and the third scan driver 13GR may be configured substantially identically to the first scan driver 13GW, and therefore, overlapping descriptions will be omitted.

The emission driver 15 may include a first emission driver 15EM and a second emission driver 15EMB. The first emission driver 15EM may provide first emission signals to first emission lines EM1, . . . , EMi, . . . , and EMp. The second emission driver 15EMB may provide second emission signals to second emission lines EMB1, . . . , EMBi . . . , and EMBp.

For example, the first emission driver 15EM may generate the first emission signals to be supplied to the first emission lines EM1 to EMp by receiving at least one clock signal CLKe1 and a first emission stop signal ESP1 from the timing controller 11. The first emission driver 15EM may sequentially provide the first emission signals having a pulse of a turn-on level to the first emission lines EM1 to EMp. For example, the first emission driver 15EM may be configured in the form of shift registers, and may generate the first emission signals in a manner that sequentially transfers the first emission stop signal ESP1 in the form of a pulse of a turn-on level to a next (e.g., subsequent) scan stage under the control of the clock signal CLKe1.

The second emission driver 15EMB may generate the second emission signals to be supplied to the second emission lines EMB1 to EMBp by receiving at least one clock signal CLKe2 and a second emission stop signal ESP2 from the timing controller 11. The second emission driver 15EMB may be configured substantially identically to the first emission driver 15EM, and therefore, overlapping descriptions will be omitted.

The pixel unit 14 may include pixels. Each pixel PXij may be connected to a corresponding data line DLj, corresponding scan lines GWi, GIi, and GRi, and corresponding emission lines EMi and EMBi. The pixels may display an image, using data voltages received from the data driver 12.

The pixel unit 14 may include first pixels for emitting light of the first color, second pixels for emitting light of the second color, and third pixels for emitting light of the third color. The first color, the second color, and the third color may be different colors. For example, the first color may be one color among red, green, or blue, the second color may be another color instead of the first color among red, green, or blue, and the third color may be the other color instead of the first color and the second color among red, green, or blue. In addition, magenta, cyan, and/or yellow instead of red, green, and/or blue may be used as the first to third colors.

The pixels of the pixel unit 14 may be arranged in various forms, such as diamond PENTILE™, Diamond Pixel™, RGB-stripe, S-stripe, real RGB, and normal PENTILE™ (PENTILET and Diamond Pixel™ being registered trademarks of Samsung Display Co., Ltd., Republic of Korea).

Figure 2:
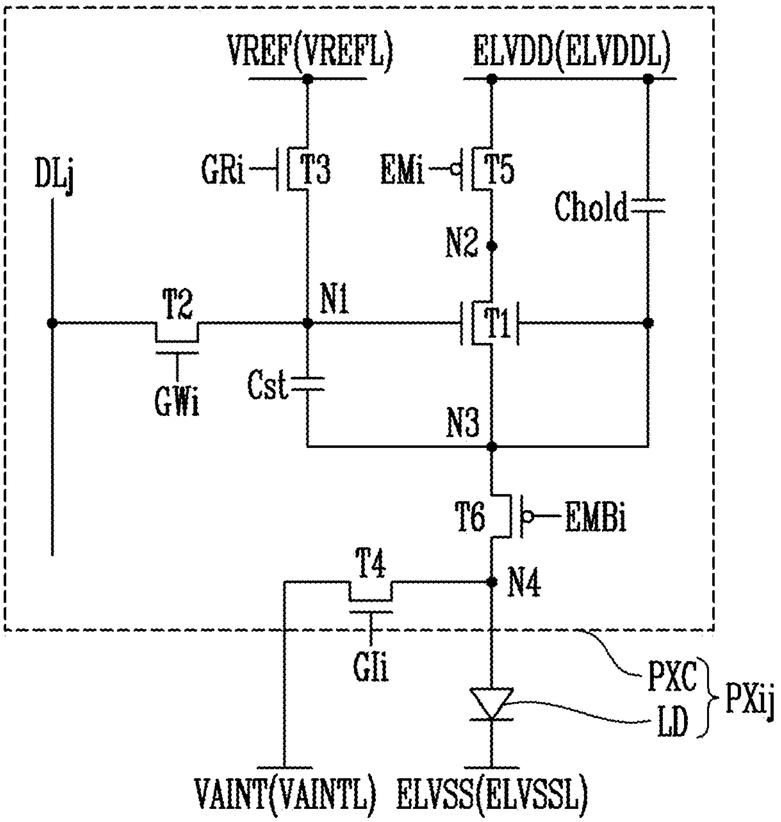
FIG. 2 is a diagram illustrating a pixel in accordance with one or more embodiments of the disclosure.

FIG. 2 is a diagram illustrating a pixel in accordance with one or more embodiments of the disclosure.

Referring to FIG. 2, a pixel PXij in accordance with one or more embodiments of the disclosure may include a pixel circuit PXC and a light-emitting element LD. The pixel circuit PXC may include transistors T1, T2, T3, T4, T5, and T6, a first capacitor Cst, and a second capacitor Chold.

P-type transistors may be poly-silicon semiconductor transistors. In the poly-silicon semiconductor transistor, a channel of an active layer may include a poly-silicon semiconductor. For example, the poly-silicon semiconductor transistor may be a Low Temperature Poly-Silicon (LTPS) thin film transistor. The poly-silicon semiconductor transistor has a high electron mobility, and has a fast driving characteristic according to the high electron mobility.

N-type transistors may be oxide semiconductor transistors. In the oxide semiconductor transistor, a channel of an active layer may include an oxide semiconductor. For example, the oxide semiconductor transistor may be a Low Temperature Polycrystalline Oxide (LTPO) thin film transistor. The oxide semiconductor transistor has a low charge mobility as compared with the poly-silicon semiconductor transistor. Therefore, an amount of leakage current generated in a turn-off state of the oxide semiconductor transistors may be small as compared with the poly-silicon semiconductor transistors.

A gate electrode of a first transistor T1 may be connected to a first node N1, a first electrode of the first transistor T1 may be connected to a second node N2, and a second electrode of the first transistor T1 may be connected to a third node N3. The first transistor T1 may control an amount of driving current flowing from the first power line ELVDDL to a second power line ELVSSL. For example, the first transistor T1 may control the amount of driving current, based on a data voltage. The first transistor T1 may be referred to as a driving transistor. The first transistor T1 may be an N-type transistor.

A body of the first transistor T1 may be connected to the third node N3. The body of the first transistor T1 may be connected to the third node N3 such that a characteristic of an output current with respect to an input voltage of the first transistor T1 is controlled. For example, the first transistor T1 may mainly operate in a saturation state. If the body of the first transistor T1 is not connected to the third node N3, a magnitude of the output current may vary according to a change in drain-source voltage even though a same gate-source voltage is provided. A characteristic of the first transistor T1 is controlled to be insensitive to the change in drain-source voltage, so that a substantially same current can be output with respect to the same gate-source voltage.

A gate electrode of a second transistor T2 may be connected to a first scan line GWi, a first electrode of the second transistor T2 may be connected to a data line DLj, and a second electrode of the second transistor T2 may be connected to the first node N1. The second transistor T2 may receive a data voltage from the data line DLj in case that the second transistor T2 receives a first scan signal having a turn-on level. Therefore, the second transistor T2 may be referred to as a data writing transistor. The second transistor T2 may be an N-type transistor.

A gate electrode of a third transistor T3 may be connected to a third scan line GRi, a first electrode of the third transistor T3 may be connected to a reference voltage line VREFL providing a reference voltage VREF, and a second electrode of the third transistor T3 may be connected to the first node N1. The third transistor T3 may be connected between the reference voltage line VREFL and the gate electrode of the first transistor T1, and the gate electrode of the third transistor T3 may receive a third scan signal. The third transistor T3 may be referred to as a reference transistor. The third transistor T3 may be an N-type transistor.

A gate electrode of a fourth transistor T4 may be connected to a second scan line GIi, a first electrode of the fourth transistor T4 may be connected to an initialization line VAINTL providing an initialization voltage VAINT, and a second electrode of the fourth transistor T4 may be connected to a fourth node N4. The fourth transistor T4 may be connected between the initialization voltage line VAINTL and an anode electrode of the light-emitting element LD, and the gate electrode of the fourth transistor T4 may receive a second scan signal. The fourth transistor T4 may be referred to as an initialization transistor. The fourth transistor T4 may be an N-type transistor.

A gate electrode of a fifth transistor T5 may be connected to a first emission line EMi, a first electrode of the fifth transistor T5 may be connected to the first power line ELVDDL providing a first power voltage ELVDD, and a second electrode of the fifth transistor T5 may be connected to the second node N2. The fifth transistor T5 may be connected between the first power line ELVDDL and the first transistor T1, and the gate electrode of the fifth transistor T5 may receive a first emission signal. The fifth transistor T5 may be referred to as a first emission transistor. The fifth transistor T5 may be a P-type transistor.

A gate electrode of a sixth transistor T6 may be connected to a second emission line EMBi, a first electrode of the sixth transistor T6 may be connected to the third node N3, and a second electrode of the sixth transistor T6 may be connected to the fourth node N4. The sixth transistor T6 may be connected between the first transistor T1 and the light-emitting element LD, and the gate electrode of the sixth transistor T6 may receive a second emission signal. The sixth transistor T6 may be referred to as a second emission transistor. The sixth transistor T6 may be a P-type transistor.

The first capacitor Cst may connect the first node N1 and the third node N3 to each other. A first electrode of the second capacitor Chold may be connected to the first power line ELVDDL, and a second electrode of the second capacitor Chold may be connected to the third node N3.

The anode electrode of the light-emitting element LD may be connected to the fourth node N4, and a cathode electrode of the light-emitting element LD may be connected to the second power line ELVSSL providing a second power voltage ELVSS. The light-emitting element LD may emit light, based on the driving current.

The light-emitting element LD may be a light-emitting diode. The light-emitting element LD may be configured as an organic light-emitting diode, an inorganic light-emitting diode, a quantum dot/well light-emitting diode, or the like. One light-emitting element LD is provided in each pixel. However, in one or more other embodiments, a plurality of light-emitting elements may be provided in each pixel. The plurality of light-emitting elements may be connected in series, parallel, series/parallel, or the like. A light-emitting element LD of each pixel PXij may emit light of one of the first color, the second color, or the third color.

Figure 3:
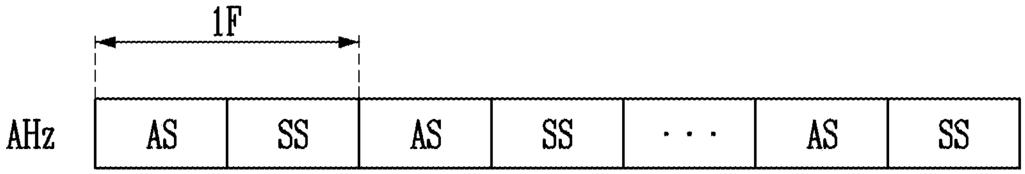
FIGS. 3 and 4 are diagrams illustrating a display frequency change in accordance with one or more embodiments of the disclosure.
Figure 4:
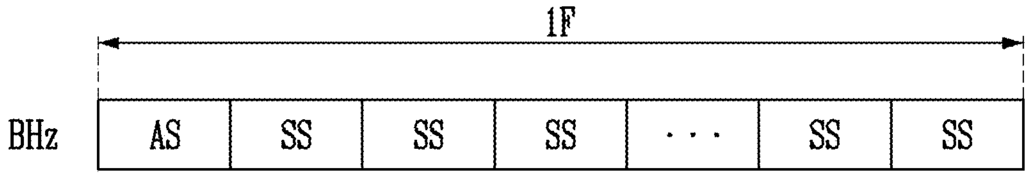

FIGS. 3 and 4 are diagrams illustrating a display frequency change in accordance with one or more embodiments of the disclosure.

The display device 10 may support a Variable Refresh Rate (VRR). A refresh rate is a frequency at which a data voltage is written to the pixel PXij, and may be referred to as a screen scan rate, or a screen refresh rate. The refresh rate may represent a number of image frames reproduced for a second.

For example, the pixel unit 14 may display an image at a first frequency AHz in a first mode (see FIG. 3), and may display an image at a second frequency BHz lower than the first frequency AHz in a second mode (see FIG. 4).

For example, each frame period 1F in the first mode may include an address scan period AS and a self-scan period SS with respect to each pixel PXij. For example, each frame period 1F in the second mode may include an address scan period AS and a plurality of self-scan periods SS with respect to each pixel PXij. As the second frequency BHz becomes lower, a number of self-scan periods SS included in a frame period 1F may increase. In another example, each frame period 1F in a third mode may include only an address scan period AS with respect to each pixel PXij, and may include no self-scan period SS.

The address scan period AS is a period in which a data voltage is written to the pixel PXij. The address scan period AS may be referred to as a data programming period in which a data voltage is received from the data line DLj.

The self-scan period SS is a period in which no data voltage is written to the pixel PXij. During an emission period of the self-scan period SS, the pixel PXij may emit light, using the data voltage written in the address scan period AS. A length of the self-scan period SS may be equal to a length of the address scan period AS.

Figure 5:
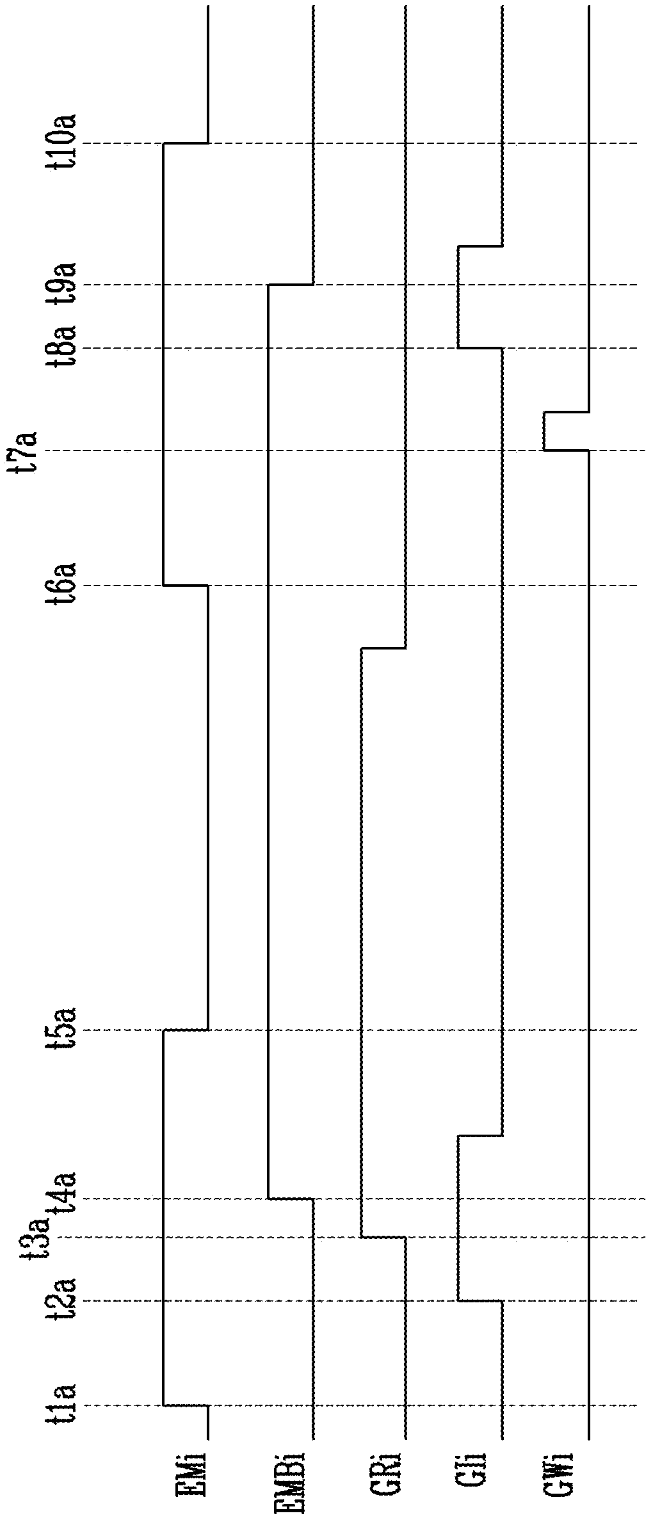
FIG. 5 is a diagram illustrating an address scan period in accordance with one or more embodiments of the disclosure.

FIG. 5 is a diagram illustrating an address scan period in accordance with one or more embodiments of the disclosure.

An address scan period ASa shown in FIG. 5 is an example of the address scan period AS shown in FIGS. 3 and 4. Hereinafter, a pixel row connected to ith scan lines GWi, GIi, and GRi and ith emission lines EMi and EMBi will be mainly described.

First, at a time point t1*a*, a first emission signal having a turn-off level (e.g., a high level) may be applied to the first emission line EMi. Accordingly, the fifth transistor T5 may be turned off, and an emission period based on a data voltage written in a previous frame period is terminated.

Next, at a time point t2*a*, a second scan signal having a turn-on level (e.g., a high level) may be applied to the second scan line GIi, so that the fourth transistor T4 is turned on. Accordingly, the initialization voltage VAINT may be applied to the fourth node N4. Therefore, an anode voltage of the light-emitting element LD may be initialized. The sixth transistor T6 is in a turn-on state, and therefore, the initialization voltage VAINT may be applied even to the third node N3. Therefore, a voltage of the second electrode of the second capacitor Chold may be initialized.

Next, at a time point t3*a*, a third scan signal having a turn-on level may be applied to the third scan line GRi, so that the third transistor T3 is turned on. Accordingly, the reference voltage VREF may be applied to the first node N1. Therefore, voltages at both ends of the first capacitor Cst may be initialized.

Next, at a time point t4*a*, a second emission signal having a turn-off level may be applied to the second emission line EMBi, so that the sixth transistor T6 is turned off. Accordingly, the third node N3 and the fourth node N4 may be electrically separated from each other.

Next, at a time point t5*a*, a first emission signal having a turn-on level (e.g., a low level) may be applied to the first emission line EMi, so that the fifth transistor T5 is turned on. As described above, the voltages at both the ends of the first capacitor Cst have been initialized, and the first capacitor Cst is in a state in which a difference in voltage between the gate electrode of the first transistor T1 (e.g., the first node N1) and a source electrode of the first transistor T1 (e.g., the third node) is maintained to be higher than a threshold voltage of the first transistor T1 at the time point t5*a*. Therefore, the first transistor T1 may be in a turn-on state at the time point t5*a*. A current supplied from the first power voltage ELVDD through the fifth transistor T5 and the first transistor T1, which are turned on, and therefore, a voltage of the third node N3 may be gradually increased. If the difference in voltage between the gate electrode of the first transistor T1 (e.g., the first node N1) and a source electrode of the first transistor T1 (e.g., the third node) reaches the threshold voltage of the first transistor T1, the first transistor T1 may be turned off, and the voltage of the third node N3 may be maintained. Accordingly, the first capacitor Cst may store a voltage corresponding to the threshold voltage of the first transistor T1. A period in which the voltage corresponding to the threshold voltage of the first transistor T1 is stored in the first capacitor Cst may be referred to as a compensation period. At a time point t6*a*, the compensation period may be terminated while a first emission signal having a turn-off level (e.g., a high level) is supplied to the first emission line EMi.

Next, at a time point t7*a*, a first scan signal having a turn-on level (e.g., a high level) may be applied to the first scan line GWi, so that the second transistor T2 is turned on. In a state in which a data voltage is applied to the data line DLj, the data voltage may be written to the first node N1. The voltage of the third node N3 may vary according to a capacitance ratio of the capacitors Cst and Chold and a voltage of the third node N3, which is pre-stored in the compensation period.

Next, a time point t8*a*, a second scan signal having a turn-on level (e.g., a high level) may be applied to the second scan line Gli, so that the fourth transistor T4 is turned on. Thus, the anode voltage of the light-emitting element LD is initialized to the initialization voltage VAINT, so that it can be effective to express a low grayscale, such as a black grayscale.

Next, a time point t9*a*, a second emission signal having a turn-on level (e.g., a low level) may be applied to the second emission line EMBi, so that the sixth transistor T6 is turned on. Accordingly, the first transistor T1 may be connected to the anode electrode of the light-emitting element LD.

Next, at a time point t10*a*, a first emission signal having a turn-on level (e.g., a low level) may be applied to the first emission line EMi, so that the fifth transistor T5 is turned on. Accordingly, a driving current path may be provided, which is connected from the first power voltage ELVDD to the second power voltage ELVSS via the fifth transistor, the first transistor T1, and the sixth transistor T6, and the light-emitting element LD may emit light with a luminance corresponding to an amount of driving current flowing along the driving current path.

Figure 6:
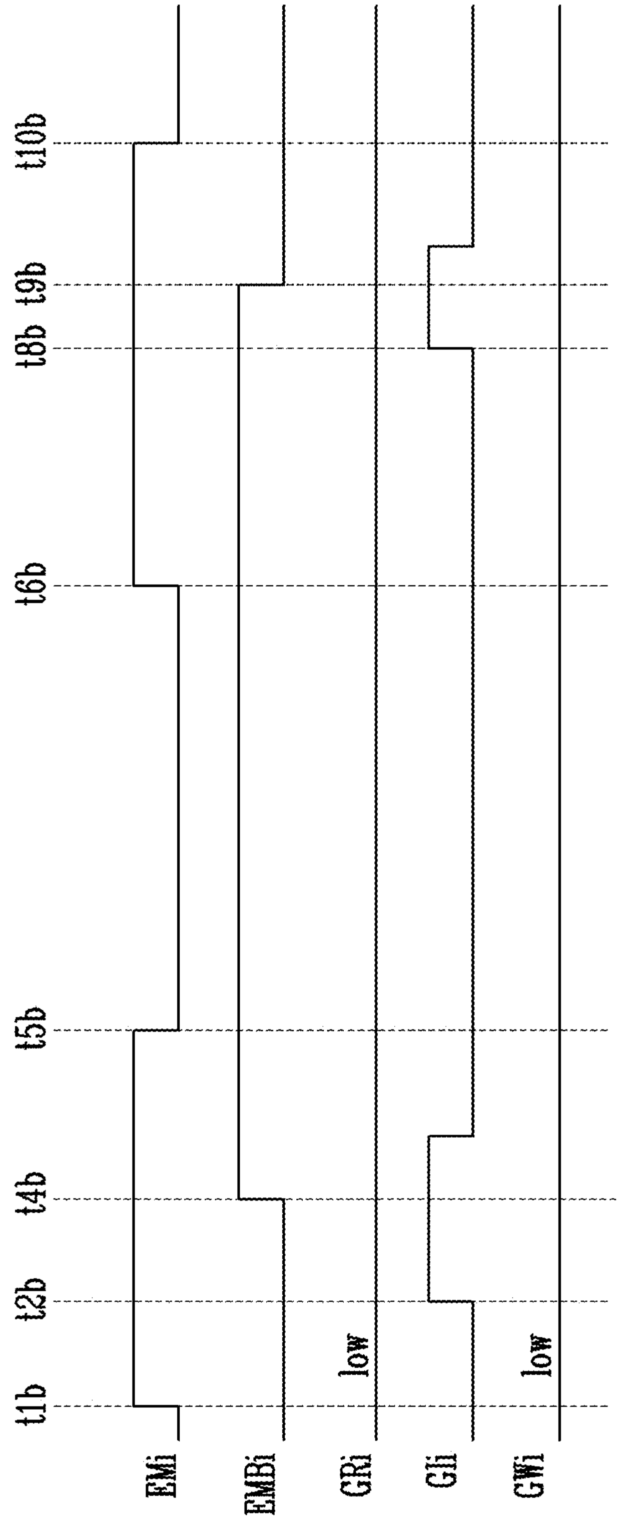
FIG. 6 is a diagram illustrating a self-scan period in accordance with one or more embodiments of the disclosure.

FIG. 6 is a diagram illustrating a self-scan period in accordance with one or more embodiments of the disclosure.

A self-scan period SSb shown in FIG. 6 is an example of the self-scan period SS shown in FIGS. 3 and 4. During the self-scan period SSb shown in FIG. 6, signals having the same waveforms as the signals in the address scan period shown in FIG. 5 may be applied to the first emission line EMi, the second emission line EMBi, and the second scan line Gli. However, scan signals having a turn-off level, which are applied to the first scan line GWi and the third scan line GRi, may be maintained. Accordingly, the first node N1 may be in a floating state, and a difference between the voltages at both the ends of the first capacitor Cst may be maintained. Therefore, a luminance of the light-emitting element LD after the self-scan period SSb shown in FIG. 6 may be equal to a luminance of the light-emitting element LD after a just previous address scan period ASa.

Figure 7:
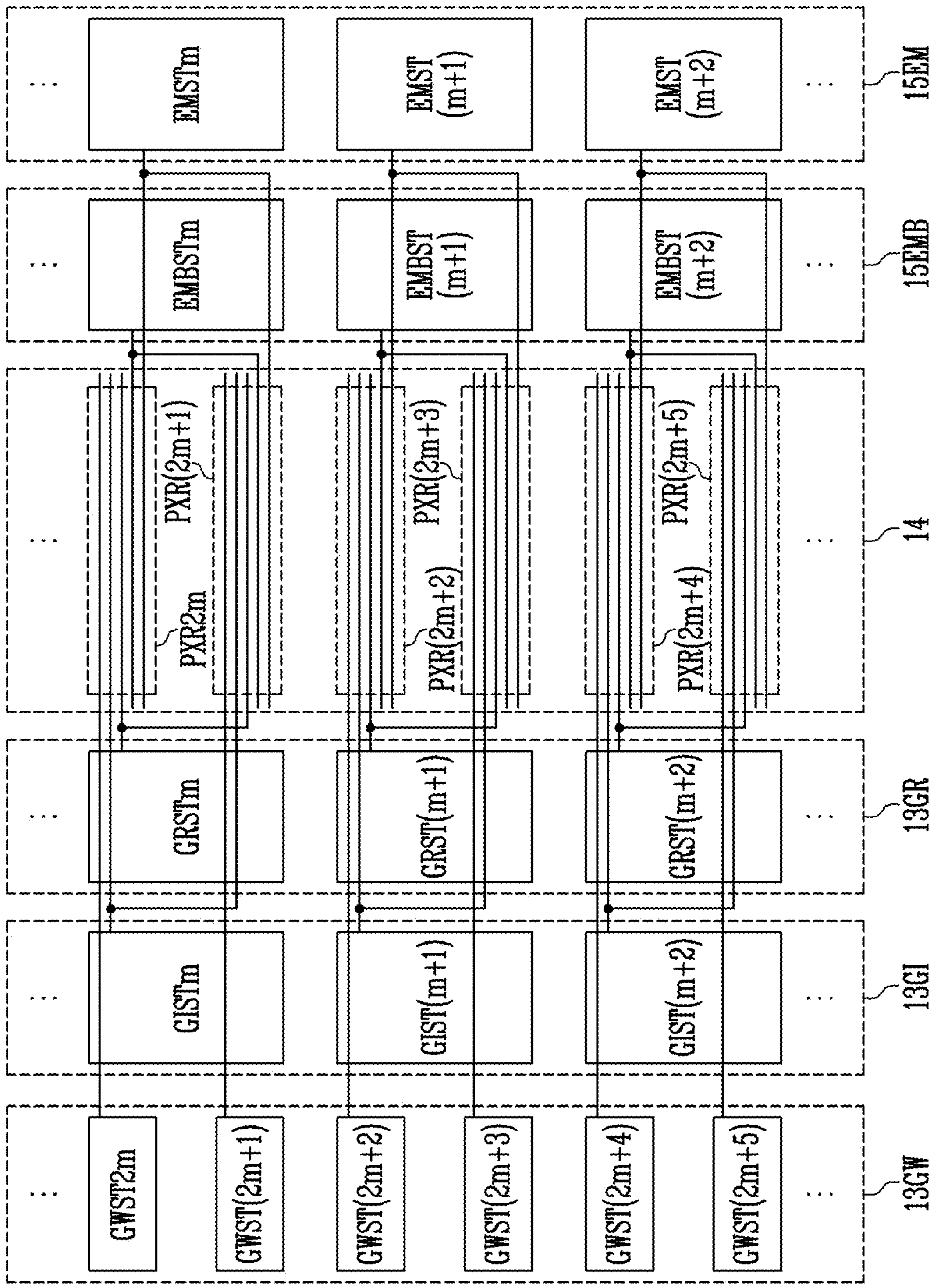
FIG. 7 is a diagram illustrating a connection relationship between stages and pixel rows in accordance with one or more embodiments of the disclosure.

FIG. 7 is a diagram illustrating a connection relationship between stages and pixel rows in accordance with one or more embodiments of the disclosure.

Referring to FIG. 7, the pixel unit 14 may include a plurality of pixel rows PXR2*m*, PXR(2*m*+1), PXR(2*m*+2), PXR(2*m*+3), PXR(2*m*+4), PXR(2*m*+5), . . . . Here, m may be an integer greater than 0. Pixels included in a same pixel row may be connected to same scan lines and same emission lines.

The first scan driver 13GW may include a plurality of stages GWST2*m*, GWST(2*m*+1), GWST(2*m*+2), GWST(2*m*+3), GWST(2*m*+4), GWST(2*m*+5), . . . , and each of the stages GWST2*m*, . . . may be connected to a pixel row through a first scan line. Because a first scan signal having a turn-on level determines a data writing timing, it might not be suitable that each of the stages GWST2*m*, . . . is connected to a plurality of first scan lines.

The second scan driver 13GI may include a plurality of stages GISTm, GIST(m+1), GIST(m+2), . . . , and each of the stages GISTm, . . . may be connected to a plurality of pixel rows through a plurality of second scan lines. For example, each of the stages GISTm, . . . may be connected to two pixel rows through two second scan lines. Thus, the second scan driver 13GI includes stages of which number is less than a number of stages included in the first scan driver 13GW, so that a suitable area can be reduced. For example, the number of the stages GISTm, . . . included in the second scan driver 13GI may be a half of the number of the stages GWST2*m*, . . . included in the first scan driver 13GW.

Similarly, the third scan driver 13GR may include a plurality of stages GRSTm, GRST(m+1), GRST(m+2), . . . , and each of the stages GRSTm, . . . may be connected to a plurality of pixel rows through a plurality of third scan lines. The first emission driver 15EM may include a plurality of stages EMSTm, EMST(m+1), EMST(m+2), . . . , and each of the stages EMSTm, . . . may be connected to a plurality of pixel rows through a plurality of first emission lines. The second emission driver 15EMB may include a plurality of stages EMBSTm, EMBST(m+1), EMBST(m+2), . . . , and each of the stages EMBSTm, . . . may be connected to a plurality of pixel rows through a plurality of second emission lines.

Figure 8:
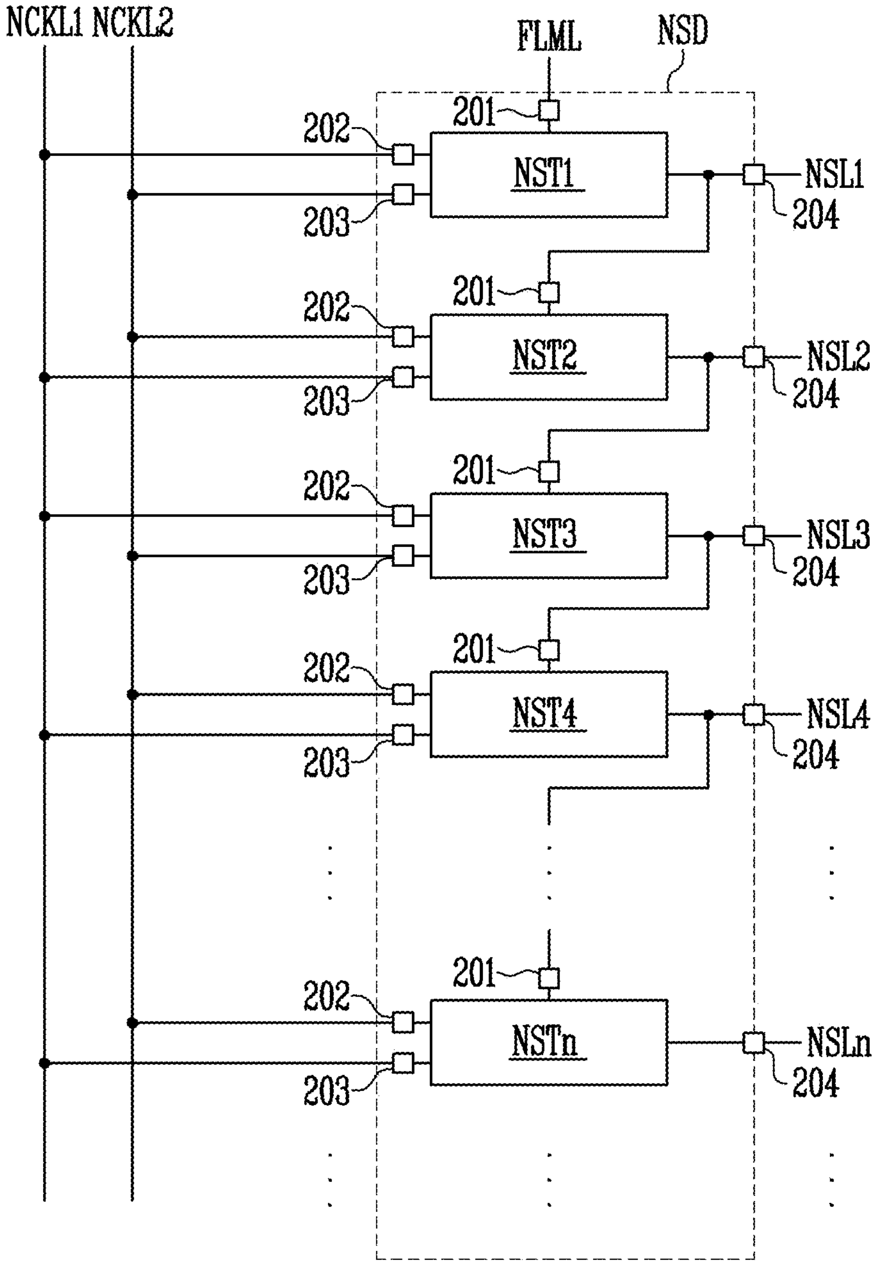
FIGS. 8 to 10 are diagrams illustrating an example stage circuit and a driving method thereof.
Figure 9:
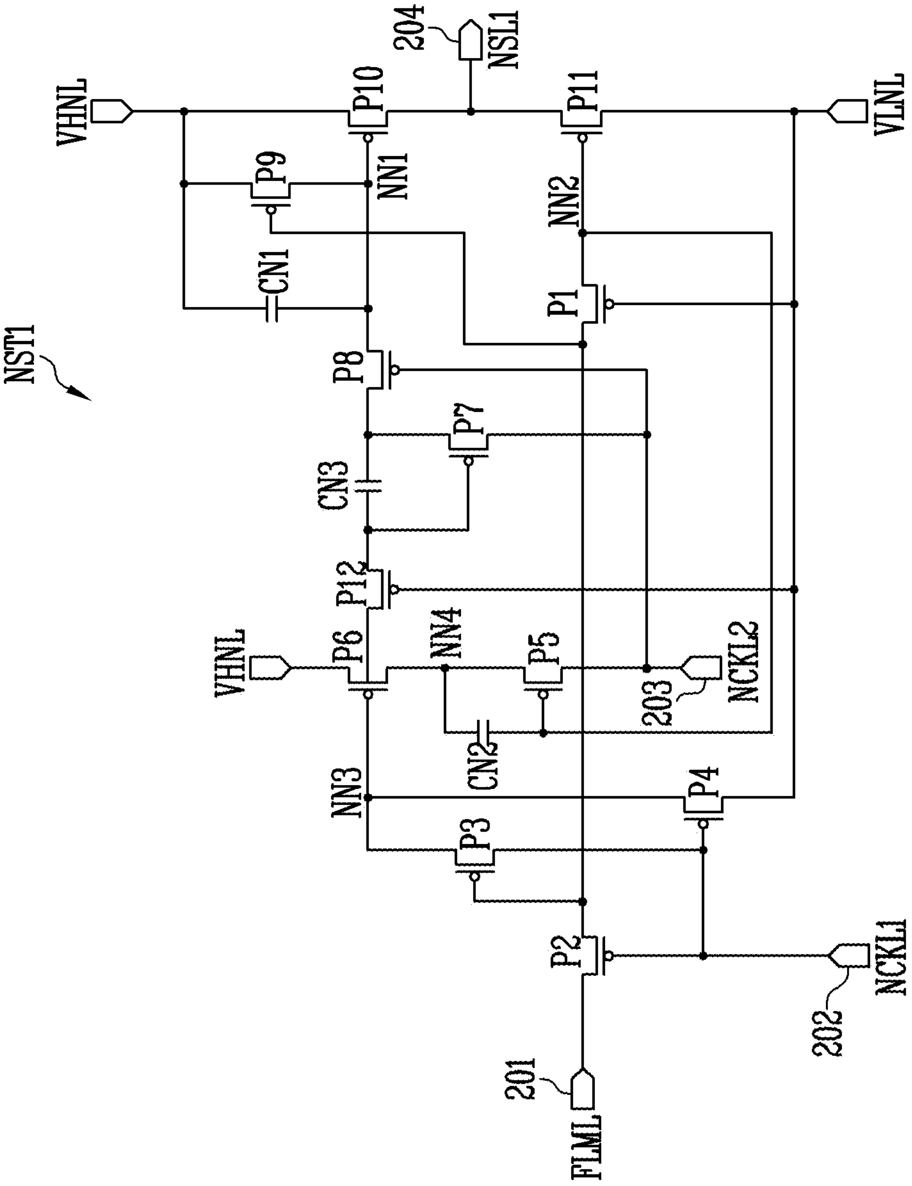
Figure 10:
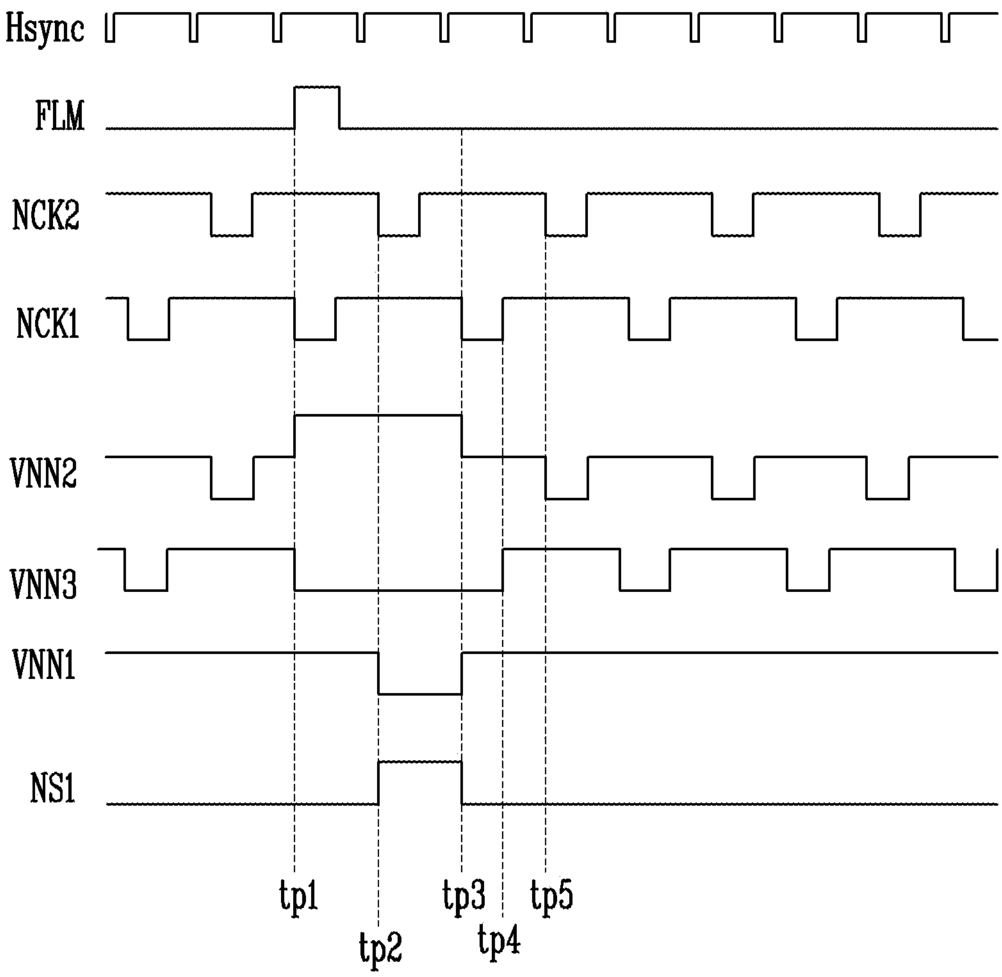

FIGS. 8 to 10 are diagrams illustrating an example stage circuit and a driving method thereof.

Referring to FIG. 8, an example control driver NSD is illustrated. Each of the scan drivers 13GW, 13GI, and 13GR and the emission drivers 15EM and 15EMB may be configured identically to the control driver NSD. However, FIGS. 8 to 10 illustrate an example configuration of the scan drivers 13GW, 13GI, and 13GR and the emission drivers 15EM and 15EMB, and the scan drivers 13GW, 13GI, and 13GR and the emission drivers 15EM and 15EMB may be configured in another structure already known in the art.

The control driver NSD may include stages NST1, NST2, NST3, NST4, . . . , and NSTn. Each of the stages NST1 to NSTn may be connected to a previous control line (or carry line) through a first input terminal 201. However, there exists no previous control line connected a first stage NST1, and therefore, the first stage NST1 may be connected to a control start line FLML through a first input terminal 201.

In some embodiments, each of odd-numbered stages NST1, NST3, . . . may include a second input terminal 202 to which a clock line NCKL1 is connected and a third input terminal 203 to which a clock line NCKL2 is connected. Each of even-numbered stages NST2, NST4, . . . , NSTn may include a second input terminal 202 to which the clock line NCKL2 is connected and a third input terminal 203 to which the clock line NCKL1 is connected.

In other embodiments, each of the odd-numbered stages NST1, NST3, . . . may include a second input terminal 202 to which the clock line NCKL2 is connected, and may include a third input terminal 203 to which the clock line NCKL1 is connected. Each of the even-numbered stages NST2, NST4, . . . , and NSTn may include a second input terminal 202 to which the clock line NCKL1 is connected, and may include a third input terminal 203 to which the clock line NCKL2 is connected.

Clock signals NCK1 and NCK2 applied to the clock lines NCKL1 and NCKL2 may correspond to at least one clock signal CLKs1, CLKs2, CLKs3, CLKe1, and/or CLKe2 applied to each of the scan driver 13GW, 13GI, and 13GR and the emission drivers 15EM and 15EMB (see FIG. 1).

Each of the stages NST1 to NSTn may be connected to a corresponding control line among control lines NSL1 to NSLn through an output terminal 204.

The stages NST1 to NSTn may be connected to each other in the form of shift registers. For example, the stages NST1 to NSTn may generate control signals in a manner that sequentially transfer, to a next stage, a control start signal FLM in the form of a pulse of a turn-on level, which is supplied to the control start line FLML. The control start signal FLM may control the first scan start signal GSP1 of the first scan driver 13GW, the second scan start signal GSP2 of the second scan driver 13GI, the third scan start signal GSP3 of the third scan driver 13GR, the first emission stop signal ESP1 of the first emission driver 15EM, and the second emission stop signal ESP2 of the second emission driver 15EMB (see FIG. 1).

Referring to FIG. 9, the first stage NST1 of the control driver NSD shown in FIG. 8 is illustrated. The other stages NST2, NST3, NST4, . . . , and NSTn shown in FIG. 8 may be configured substantially identically to the stage NST1, and therefore, overlapping descriptions will be omitted.

The stage NST1 may include transistors P1 to P12 and capacitors CN1 to CN3. The transistors P1 to P12 may be P-type transistors.

A first electrode of a transistor P2 may be connected to a second electrode of a transistor P1, a second electrode of the transistor P2 may be connected to the control start line FLML, and a gate electrode of the transistor P2 may be connected to the clock line NCKL1.

A first electrode of a transistor P3 may be connected to a node NN3, a second electrode of the transistor P3 may be connected to the clock line NCKL1, and a gate electrode of the transistor P3 may be connected to the first electrode of the transistor P2.

In some embodiments, the transistor P3 may include a first sub-transistor and a second sub-transistor, which are connected in series to each other. A first electrode of the first sub-transistor may be connected to the node NN3, a second electrode of the first sub-transistor may be connected to a first electrode of the second sub-transistor, and a gate electrode of the first sub-transistor may be connected to the first electrode of the transistor P2. The first electrode of the second sub-transistor may be connected to the second electrode of the first sub-transistor, a second electrode of the second sub-transistor may be connected to the clock line NCKL1, and a gate electrode of the second sub-transistor may be connected to the first electrode of the transistor P2. Current leakage can be reduced, and an excessive source-drain voltage can be divided. Accordingly, stress applied to the transistor P3 can be decreased.

A first electrode of a transistor P4 may be connected to the node NN3, a second electrode of the transistor P4 may be connected to a power line VLNL, and a gate electrode of the transistor P4 may be connected to the clock line NCKL1.

A first electrode of a transistor P5 may be connected to a node NN4, a second electrode of the transistor P5 may be connected to the clock line NCKL2, and a gate electrode of the transistor P5 may be connected to a node NN2.

A first electrode of a transistor P6 may be connected to a power line VHNL, a second electrode of the transistor P6 may be connected to the node NN4, and a gate electrode of the transistor P6 may be connected to the node NN3.

A first electrode of a transistor P7 may be connected to a first electrode of a capacitor CN3, a second electrode of the transistor P7 may be connected to the clock line NCKL2, and a gate electrode of the transistor P7 may be connected to a second electrode of the capacitor CN3.

A first electrode of the transistor P8 may be connected to a node NN1, a second electrode of the transistor P8 may be connected to the first electrode of the capacitor CN3, and a gate electrode of the transistor P8 may be connected to the NCKL2.

A first electrode of a transistor P9 may be connected to the power line VHNL, a second electrode of the transistor P9 may be connected to the node NN1, and a gate electrode of the transistor P9 may be connected to a second electrode of the transistor P1.

A first electrode of the transistor P10 may be connected to the power line VHNL, a second electrode of the transistor P10 may be connected to a control line NSL1, and a gate electrode of the transistor P10 may be connected to the node NN1.

A first electrode of a transistor P11 may be connected to the control line NSL1, a second electrode of the transistor P11 may be connected to the power line VLNL, and a gate electrode of the transistor P11 may be connected to the node NN2.

A first electrode of a transistor P12 may be connected to the second electrode of the capacitor CN3, a second electrode of the transistor P12 may be connected to the node NN3, and a gate electrode of the transistor P12 may be connected to the power line VLNL.

A first electrode of the transistor P1 may be connected to the node NN2, the second electrode of the transistor P1 may be connected to the first electrode of the transistor P2, and a gate electrode of the transistor P1 may be connected to the power line VLNL.

A first electrode of a capacitor CN1 may be connected to the power line VHNL, and a second electrode of the capacitor CN1 may be connected to the node NN1.

A first electrode of a capacitor CN2 may be connected to the node NN4, and a second electrode of the capacitor CN2 may be connected to the node NN2.

The first electrode of the capacitor CN3 may be connected to the first electrode of the transistor P7, and the second electrode of the capacitor CN3 may be connected to the gate electrode of the transistor P7.

FIG. 10 is a diagram illustrating a driving method of the stage shown in FIG. 9.

Referring to FIG. 10, there is illustrated a timing diagram of a control start signal FLM applied to the control start line FLML, a clock signal NCK2 applied to the clock line NCKL2, a clock signal NCK1 applied to the clock line NCKL1, a node voltage VNN2 of the node NN2, a node voltage VNN3 of the node NN3, a node voltage VNN1 of the node NN1, and a control signal NS1 applied to the control line NSL1. A horizontal synchronization signal Hsync is illustrated as a reference signal for timing. An interval between pulses of the horizontal synchronization signal Hsync may be referred to as a horizontal cycle.

A voltage having a high level may be applied to the power line VHNL, and a voltage having a low level may be applied to the power line VLNL. In the driving method, the transistors P12 and P1, each of which the gate electrode is connected to the power line VLNL is in a turn-on state during most periods, and therefore, descriptions of the transistors P12 and P1 will be generally omitted.

First, at a time point tp1, the control start signal FLM having a high level may be supplied, and the clock signal NCK1 having a low level may be supplied. Therefore, the transistors P2 and P4 may be turned on.

If the transistor P2 is turned on, the control start signal FLM having the high level may be transferred to the node N22, and the node voltage VNN2 may have a high level. The transistors P3, P5, P9, and P11 may be turned off by the node voltage VNN2 having the high level.

If the transistor P4 is turned on, the node NN3 and the power line VLNL may be connected to each other, and therefore, the node voltage VNN3 may have a low level. The transistors P6 and P7 may be turned on by the node voltage VNN3 having the low level.

If the transistor P6 is turned on, the node NN4 and the power line VHNL may be connected to each other. Thus, the power line VHNL supports an end of the capacitor CN2, and accordingly, the node voltage VNN2 of the node NN2 can be stably maintained.

If the transistor P7 is turned on, the first electrode of the capacitor CN3 and the clock line NCKL2 may be connected to each other. The transistor P8 may be in a turn-off state because the clock signal NCK2 having a high level is applied to the gate electrode of the transistor P8, and therefore, the node voltage VNN1 is not changed.

At a time point tp2, the clock signal NCK2 having a low level may be supplied.

The clock signal NCK2 having the low level may be supplied to the first electrode of the capacitor CN3 through the transistor P7. A voltage that is lower than the low level may be applied to the gate electrode of the transistor P7 by coupling of the capacitor CN3. Thus, a turn-on state of the transistor P7 can be stably maintained, and a driving characteristic of the transistor P7 can be improved.

The node voltage VNN3 is not influenced by the coupling of the capacitor CN3 due to the transistor P12. If a voltage that is lower than the low level is applied to the first electrode of the transistor P12 by the coupling of the capacitor CN3, the first electrode of the transistor P12 may serve as a drain electrode. Therefore, the node NN3 corresponding to the second electrode of the transistor P12 may serve as a source electrode. In addition, a voltage having a low level may be applied to the gate electrode of the transistor P12 through the power line VLNL, and therefore, a voltage higher than the low level is to be applied to the source electrode of the transistor P12 such that the transistor P12 is turned on. The transistor P12 may be in a turn-off state because the node voltage VNN3 of the node NN3 has a low level at a current time point.

The node voltage VNN3 is maintained by the transistor P12, and accordingly, an excessive bias voltage is reduced or prevented from being applied to the transistors P3 and P4, so that the lifetime of the transistors P3 and P4 can be extended.

In addition, the transistor P8 may be turned on by the clock signal NCK2 having a low level. Therefore, the node NN1 and the clock line NCKL2 may be connected to each other through the transistors P7 and P8. Accordingly, the transistor P10 may be turned on by the node voltage VNN1 having a low level. The turn-off state of the transistor P9 may be maintained by the node voltage VNN2 having a high level.

The power line VHNL and the control line NSL1 may be connected to each other through the turned-on transistor P10. Therefore, a voltage having a high level may be supplied as the control signal NS1 having a high level to the control line NSL1.

At a time point tp3, the clock signal NCK1 having a low level may be supplied. Therefore, the transistor P4 may be turned on, and the node NN3 may be connected to the power line VLNL. Therefore, the low level of the node voltage VNN3 may be maintained. In addition, the transistor P2 may be turned on, and the control start signal FLM having a low level may be supplied. Therefore, the transistors P3, P5, P9, and P11 may be turned on. Accordingly, the transistor P10 may be diode-connected such that a voltage having a high level, which is supplied to the power line VHNL, is not transferred to the control line NSL1. A voltage having a low level, which is supplied to the power line VLNL, may be transferred to the control line NSL1 through the turned-on transistor P11.

At a time point tp4, the clock signal NCK1 having a high level may be supplied. The transistor P3 may be in a turn-on state, and therefore, the node voltage VNN3 may be increased. Accordingly, the transistors P6 and P7 may be turned off.

At a time point tp5, the clock signal NCK2 having a low level may be supplied. The transistor P5 may be in a turn-on state, and therefore, the node voltage VNN2 may be decreased to a level lower the low level. Thus, the turn-on state of the transistor P11 can be stably maintained, and a driving characteristic of the transistor P11 can be improved.

A node corresponding to the second electrode of the transistor P1 is not influenced by coupling of the capacitor CN2 due to the transistor P1. If a voltage that is lower than the low level is applied to the node NN2 corresponding to the first electrode of the transistor P1 by the coupling of the capacitor CN2, the first electrode of the transistor P1 may serve as a drain electrode. Therefore, a node corresponding to the second node of the transistor P1 may serve as a source electrode. In addition, a voltage having a low level may be applied to the gate electrode of the transistor P1 through the power line VLNL, and therefore, a voltage higher than the low level is to be applied to the source electrode of the transistor P1 such that the transistor P1 is turned on. The transistor P1 may be in a turn-off state because the voltage having the low level is applied to the source electrode of the transistor P1 at a current time point.

The voltage of the node corresponding to the second electrode of the transistor P1 is maintained by the transistor P1, and accordingly, an excessive bias voltage otherwise applied to the transistors P2 and P3 is reduced or prevented, so that the lifetime of the transistors P3 and P3 can be extended.

Figure 11:
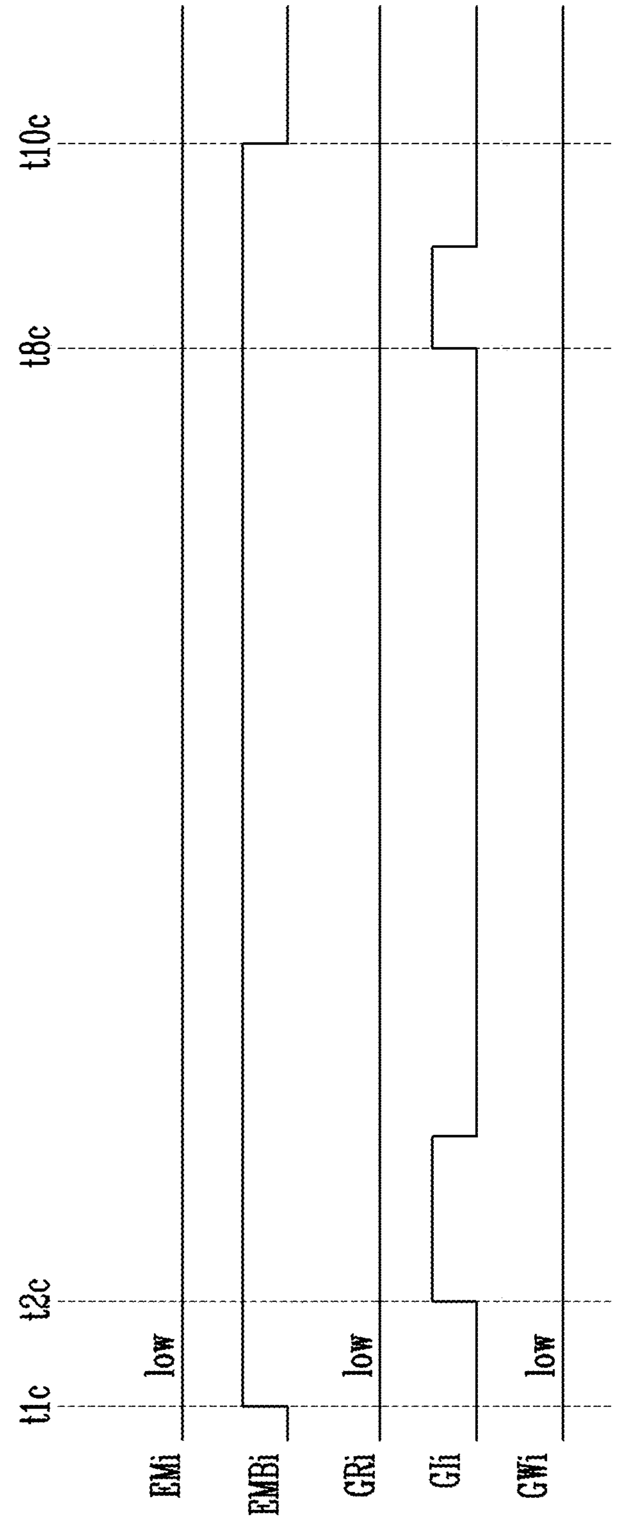
FIG. 11 is a diagram illustrating a self-scan period in accordance with one or more other embodiments of the disclosure.

FIG. 11 is a diagram illustrating a self-scan period in accordance with one or more other embodiments of the disclosure.

In a self-scan period SSc shown in FIG. 11, waveforms of the first emission signal and the second emission signal have been changed with respect to the self-scan period SSb shown in FIG. 6. For example, a waveform of the first emission signal during the address scan period ASa and a waveform of the first emission signal during the self-scan period SSc may be different from each other. In addition, a waveform of the second emission signal during the address scan period ASa and a waveform of the second emission signal during the self-scan period SSc may be different from each other.

During the address scan period ASa in which a first scan signal having a turn-on level is received, each of the first emission transistor T5 and the second emission transistor T6 may be turned off once or more (see FIG. 5). For example, referring to FIG. 5, during the address scan period ASa, the first emission transistor T5 may be turned off twice (t1*a* to t5*a* and t6*a* to t10*a*), and the second emission transistor T6 may be turned off once (t4*a* to t9*a*).

In some embodiments, during the self-scan period SSc in which a first scan signal having a turn-off level is maintained, any one of the first emission transistor T5 or the second emission transistor T6 may be turned off once or more, and a turn-on state of the other of the first emission transistor T5 and the second emission transistor T6 may be maintained. For example, during the self-scan period SSc, as the second emission signal includes a pulse of a turn-off level, the second emission transistor T6 may be turned off once (e.g., during t1*c* to t10*c*), and a turn-on level (e.g., a low level) of the first emission signal may be maintained. Therefore, a turn-on state of the fifth transistor T5 may be maintained.

A time length (t1*a*-t10*a*) for which the supply of a driving current to the light-emitting element LD is suspended during the address scan period ASa may be equal to a time length (t1*c* to t10*c*) for which the supply of a driving current to the light-emitting element LD is suspended during the self-scan period SSc. Thus, although a switch from the address scan period ASa to the self-scan period SSc is made, an emission duty ratio can be maintained, and accordingly, no abnormal display occurs.

Waveforms of the scan signals except the emission signals during the self-scan period SSc may be identical to waveforms of the scan signals during the self-scan period SSb shown in FIG. 6. For example, a waveform of the second scan signal during the address scan period ASa and a waveform of the second scan signal during the self-scan period SSc may be the same. In addition, a waveform of the third scan signal during the address scan period ASa and a waveform of the third scan signal during the self-scan period SSc may be different from each other.

According to the self-scan period SSc, the timing controller 11 does not supply the clock signal CLKe1 to the first emission driver 15EM (or constantly maintains a voltage level of the clock signal CLKe1), or lowers a frequency of the clock signal CLKe1, so that the power consumption of the display device 10 can be reduced. For example, the timing controller 11 does not supply the first emission stop signal ESP1 having a turn-off level (e.g., a high level) to the first emission driver 15EM, so that the first emission signal can be maintained at a turn-on level (e.g., a low level) (see the control start signal FLM and the control signal NS1, which are shown in FIG. 10).

Figure 12:
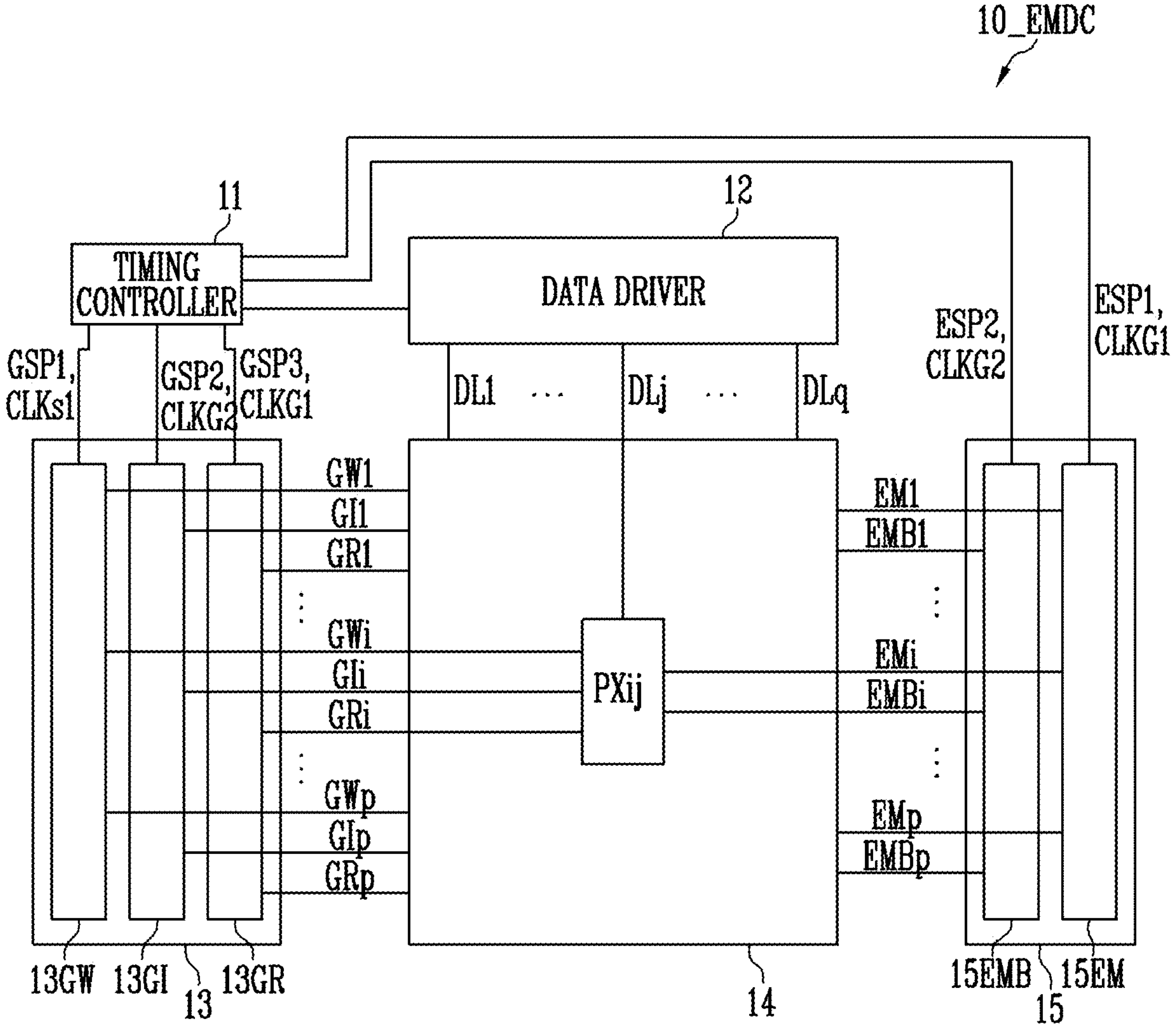
FIG. 12 is a diagram illustrating a display device applicable to a driving method shown in FIG. 11 in accordance with one or more other embodiments of the disclosure.

FIG. 12 is a diagram illustrating a display device applicable to the driving method shown in FIG. 11 in accordance with one or more other embodiments of the disclosure.

Referring to FIG. 12, a timing controller 11 of a display device 10_EMDC may supply clock signals CLKG1 of a first group to a first emission driver 15EM and a third scan driver 13GR. For example, the first emission driver 15EM and the third scan driver 13GR may share the same clock signals CLKG1 of the first group. According to the driving method shown in FIG. 11, the first emission driver 15EM and the third scan driver 13GR may not be supplied with clock signals (or may constantly maintain a voltage level of the clock signals CLKG1), or may lower a frequency of the clock signals CLKG1 during the self-scan period SSc.

Also, the timing controller 11 of the display device 10_EMDC may supply clock signals CLKG2 of a second group to a second emission driver 15EMB and a second scan driver 13GI. For example, the second emission driver 15EMB and the second scan driver 13GI may share the same clock signals CLKG2 of the second group. According to the driving method shown in FIG. 11, it is suitable for the second emission driver 15EMB and the second scan driver 13GI to receive clock signals CLKG2 of which voltage level is changed during the self-scan period SSc. Therefore, the clock signals CLKG1 of the first group and the clock signals CLKG2 of the second group may be different from each other.

The number of clock signals to be generated in the timing controller 11 is decreased, and thus the power consumption of the display device 10_EMDC can be reduced.

Figure 13:
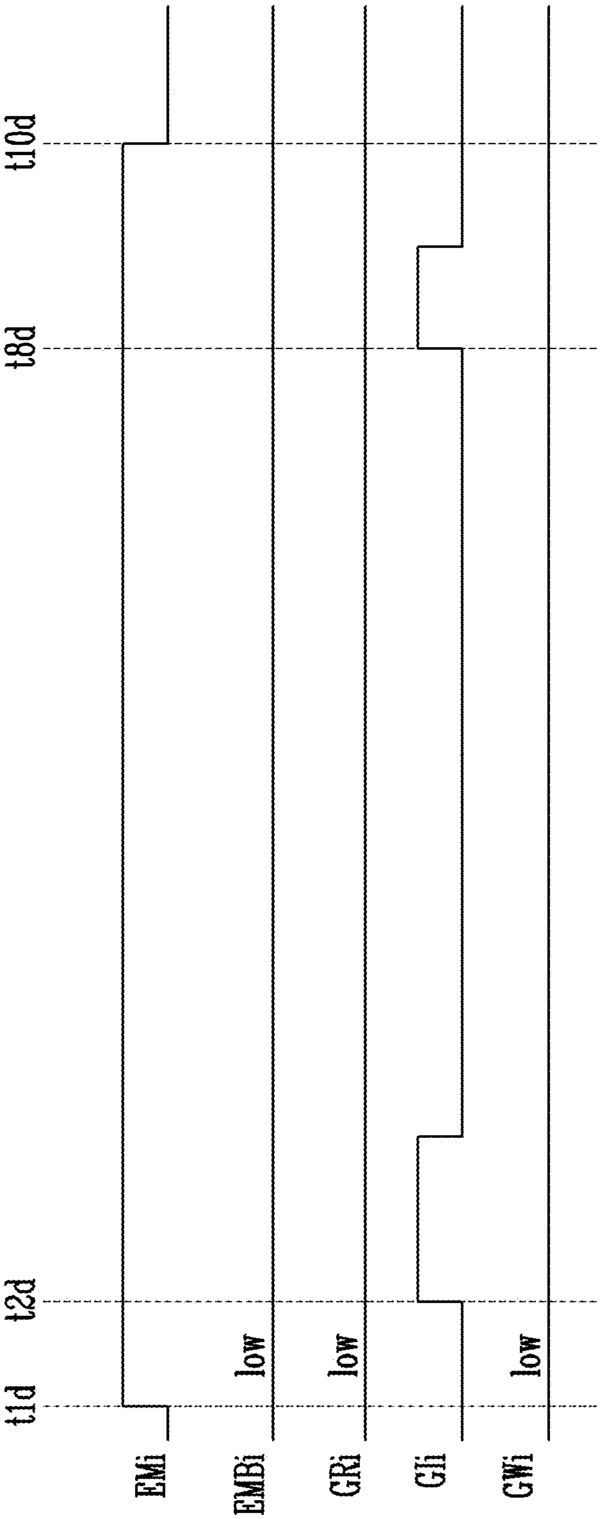
FIG. 13 is a diagram illustrating a self-scan period in accordance with still one or more other embodiments of the disclosure.

FIG. 13 is a diagram illustrating a self-scan period in accordance with still one or more other embodiments of the disclosure.

In a self-scan period SSd shown in FIG. 13, waveforms of the first emission signal and the second emission signal have been changed with respect to the self-scan period SSb shown in FIG. 6. For example, a waveform of the first emission signal during the address scan period ASa and a waveform of the first emission signal during the self-scan period SSd may be different from each other. In addition, a waveform of the second emission signal during the address scan period ASa and a waveform of the second emission signal during the self-scan period SSd may be different from each other.

During the address scan period ASa in which a first scan signal having a turn-on level is received, each of the first emission transistor T5 and the second emission transistor T6 may be turned off once or more (see FIG. 5). For example, referring to FIG. 5, during the address scan period ASa, the first emission transistor T5 may be turned off twice (t1*a* to t5*a* and t6*a* to t10*a*), and the second emission transistor T6 may be turned off once (t4*a* to t9*a*).

In some embodiments, during the self-scan period SSd in which a first scan signal having a turn-off level is maintained, any one of the first emission transistor T5 or the second emission transistor T6 may be turned off once or more, and a turn-on state of the other of the first emission transistor T5 and the second emission transistor T6 may be maintained. For example, during the self-scan period SSd, as the first emission signal includes a pulse of a turn-off level, the first emission transistor T5 may be turned off once (t1*d* to t10*d*), and a turn-on level (e.g., a low level) of the second emission signal may be maintained. Therefore, a turn-on state of the sixth transistor T6 may be maintained.

A time length (t1*a*-t10*a*) for which the supply of a driving current to the light-emitting element LD is suspended during the address scan period ASa may be equal to a time length (t1*d* to t10*d*) for which the supply of a driving current to the light-emitting element LD is suspended during the self-scan period SSd. Thus, although a switch from the address scan period ASa to the self-scan period SSd is made, an emission duty ratio can be maintained, and accordingly, no abnormal display occurs.

Waveforms of the scan signals except the emission signals during the self-scan period SSd may be identical to waveforms of the scan signals during the self-scan period SSb shown in FIG. 6. For example, a waveform of the second scan signal during the address scan period ASa and a waveform of the second scan signal during the self-scan period SSd may be the same. In addition, a waveform of the third scan signal during the address scan period ASa and a waveform of the third scan signal during the self-scan period SSd may be different from each other.

According to the self-scan period SSd, the timing controller 11 does not supply the clock signal CLKe2 to the second emission driver 15EMB (or constantly maintains a voltage level of the clock signal CLKe2), or lowers a frequency of the clock signal CLKe2, so that the power consumption of the display device 10 can be reduced. For example, the timing controller 11 does not supply the second emission stop signal ESP2 having a turn-off level (e.g., a high level) to the second emission driver 15EMB, so that the second emission signal can be maintained at a turn-on level (e.g., a low level) (see the control start signal FLM and the control signal NS1, which are shown in FIG. 10).

Figure 14:
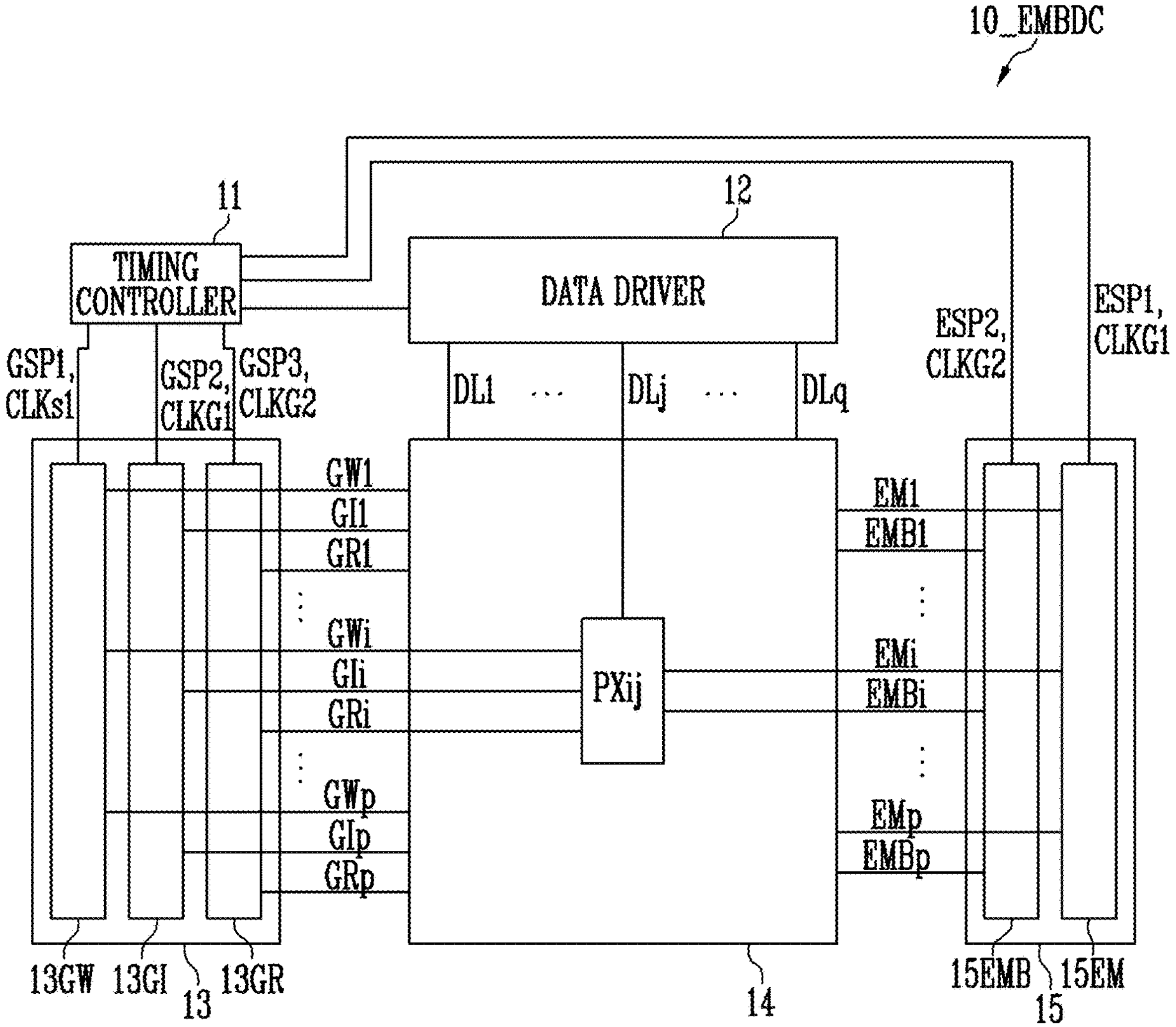
FIG. 14 is a diagram illustrating a display device applicable to a driving method shown in FIG. 13 in accordance with one or more other embodiments of the disclosure.

FIG. 14 is a diagram illustrating a display device applicable to the driving method shown in FIG. 13 in accordance with one or more other embodiments of the disclosure.

Referring to FIG. 14, a timing controller 11 of a display device 10_EMBDC may supply clock signals CLKG1 of a first group to a first emission driver 15EM and a second scan driver 13GI. For example, the first emission driver 15EM and the second scan driver 13GI may share the same clock signals CLKG1 of the first group. According to the driving method shown in FIG. 13, it is suitable for the first emission driver 15EM and the second scan driver 13GI to receive clock signals CLKG1 of which voltage level is changed during the self-scan period SSd.

Also, the timing controller 11 of the display device 10_EMBDC may supply clock signals CLKG2 of a second group to a second emission driver 15EMB and a third scan driver 13GR. For example, the second emission driver 15EMB and the third scan driver 13GR may share the same clock signals CLKG2 of the second group. According to the driving method shown in FIG. 13, the second emission driver 15EMB and the third scan driver 13GR may not be supplied with clock signals (or may constantly maintain a voltage level of the clock signals CLKG2) or may lower a frequency of the clock signals CLKG2 during the self-scan period SSd. Therefore, the clock signals CLKG1 of the first group and the clock signals CLKG2 of the second group may be different from each other.

The number of clock signals to be generated in the timing controller 11 is decreased, and thus the power consumption of the display device 10_EMBDC can be reduced.

Figure 15:
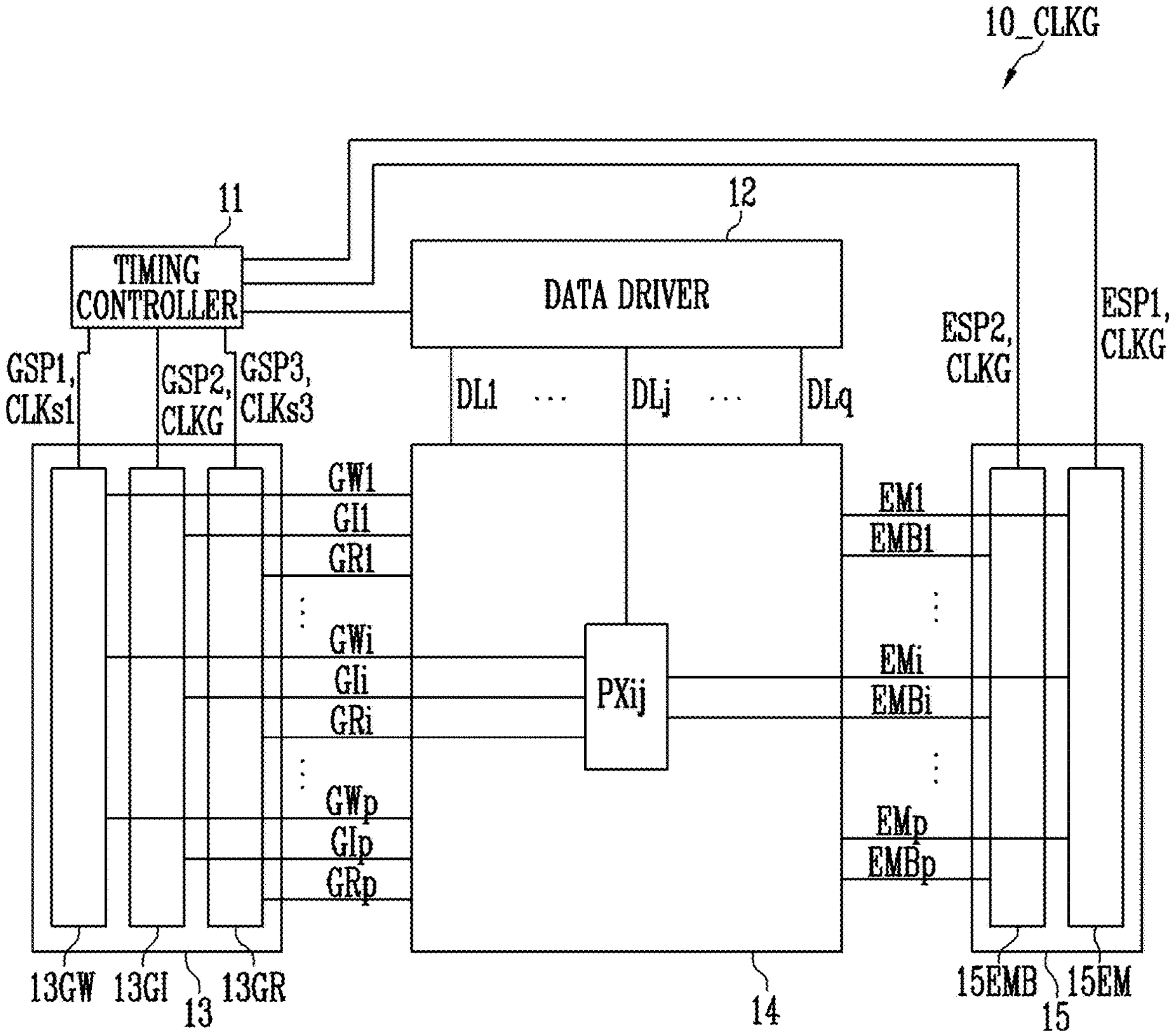
FIG. 15 is a diagram illustrating a display device applicable to a driving method shown in FIG. 6 in accordance with one or more other embodiments of the disclosure.

FIG. 15 is a diagram illustrating a display device applicable to the driving method shown in FIG. 6 in accordance with one or more other embodiments of the disclosure.

Referring to FIGS. 5 and 6, it can be seen that waveforms of the second scan signal, the first emission signal, and the second emission signal are the same in the address scan period ASa and the self-scan period SSb. Therefore, a display device 10_CLKG may supply same clock signals CLKG to the second scan driver 13GI, the first emission driver 15E, and the second emission driver 15EMB.

The number of clock signals to be generated in a timing controller 11 is decreased, and thus the power consumption of the display device 10_CLKG can be reduced.

Figure 16:
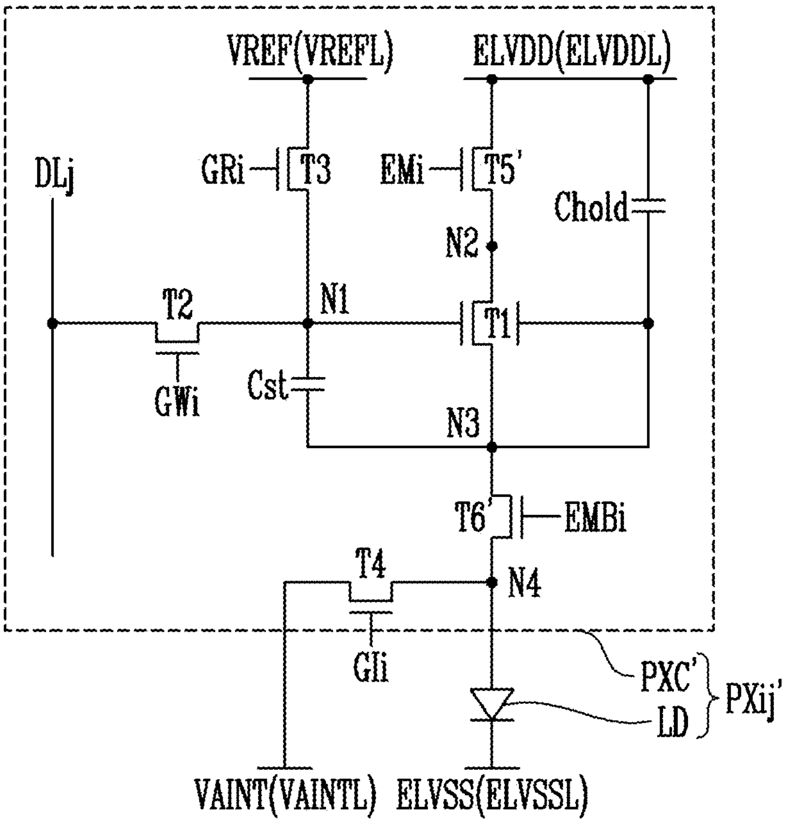
FIG. 16 is a diagram illustrating a pixel in accordance with one or more other embodiments of the disclosure.

FIG. 16 is a diagram illustrating a pixel in accordance with one or more other embodiments of the disclosure.

A pixel PXij' shown in FIG. 16 may include a pixel circuit PXC' and a light-emitting element LD. The pixel circuit PXC' is different from the pixel circuit PXC shown in FIG. 2, in that a fifth transistor T5' (or first emission transistor) and a sixth transistor T6' (or second light-emitting transistor) are configured as N-type transistors. Descriptions of components overlapping with the components shown in FIG. 2 will be omitted.

FIGS. 17 to 20 are diagrams illustrating driving methods applicable to the pixel shown in FIG. 16.

Figure 17:
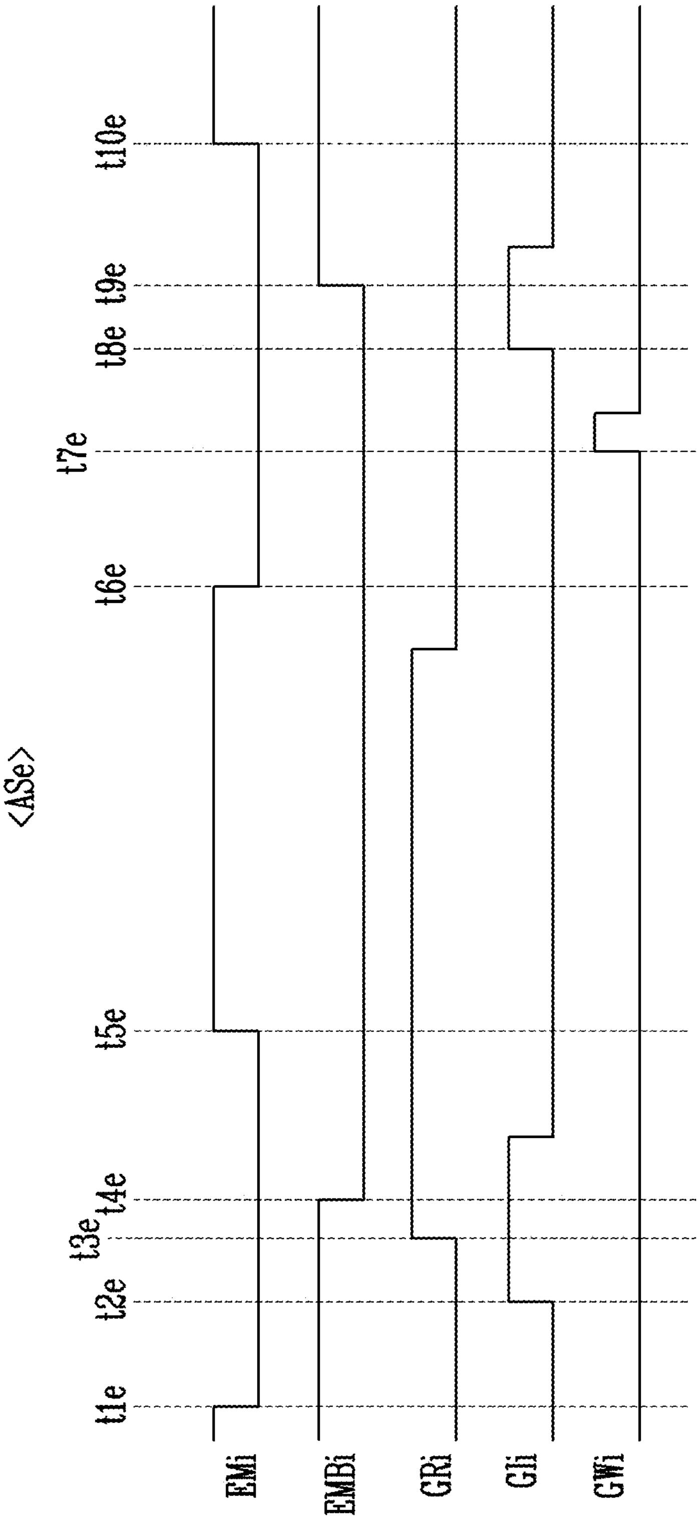
FIGS. 17 to 20 are diagrams illustrating driving methods applicable to the pixel shown in FIG. 16.

Referring to FIG. 17, time points t1*e*, t2*e*, t3*e*, t4*e*, t5*e*, t6*e*, t7*e*, t8*e*, t9*e*, and t10*e* of an address scan period ASe may correspond to the time points tla to t10*a* of the address scan period ASa shown in FIG. 5, respectively. The address scan period ASe shown in FIG. 17 may be substantially identical to the address scan period ASa shown in FIG. 5, except that polarities of the first emission signal and the second emission signal are reversed according to a change in polarity of the first emission transistor T5' and the second emission transistor T6'.

Figure 18:
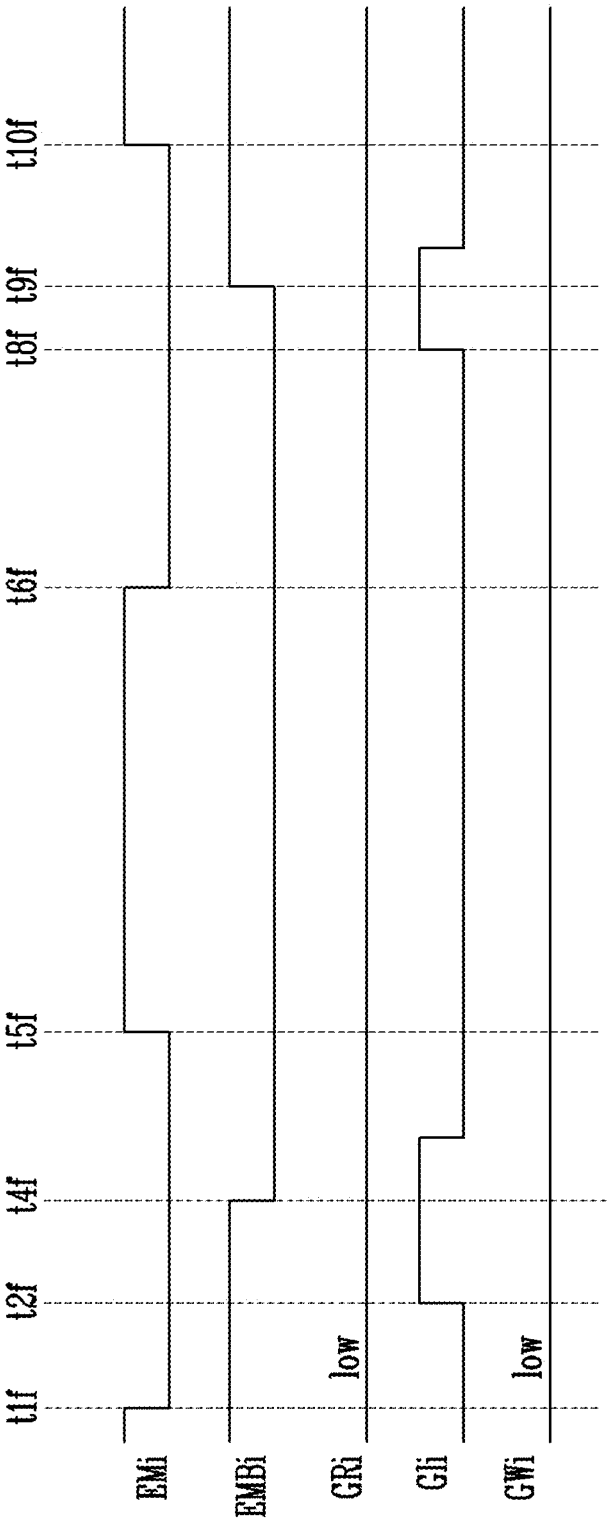

Referring to FIG. 18, time points t1*f*, t2*f*, t3*f*, t4*f*, t5*f*, t6*f*, t7*f*, t8*f*, t9*f*, and t10*f* of a self-scan period SSf may correspond to the time points t1*b* to t10*b* of the self-scan period SSb shown in FIG. 6, respectively. The self-scan period SSf shown in FIG. 18 may be substantially identical to the self-scan period SSb shown in FIG. 6, except that polarities of the first emission signal and the second emission signal are reversed according to a change in polarity of the first emission transistor T5' and the second emission transistor T6'. Therefore, the driving method shown in FIG. 18 may be applicable to the display device 10 shown in FIG. 1 and the display device 10_CLKG shown in FIG. 15.

Figure 19:
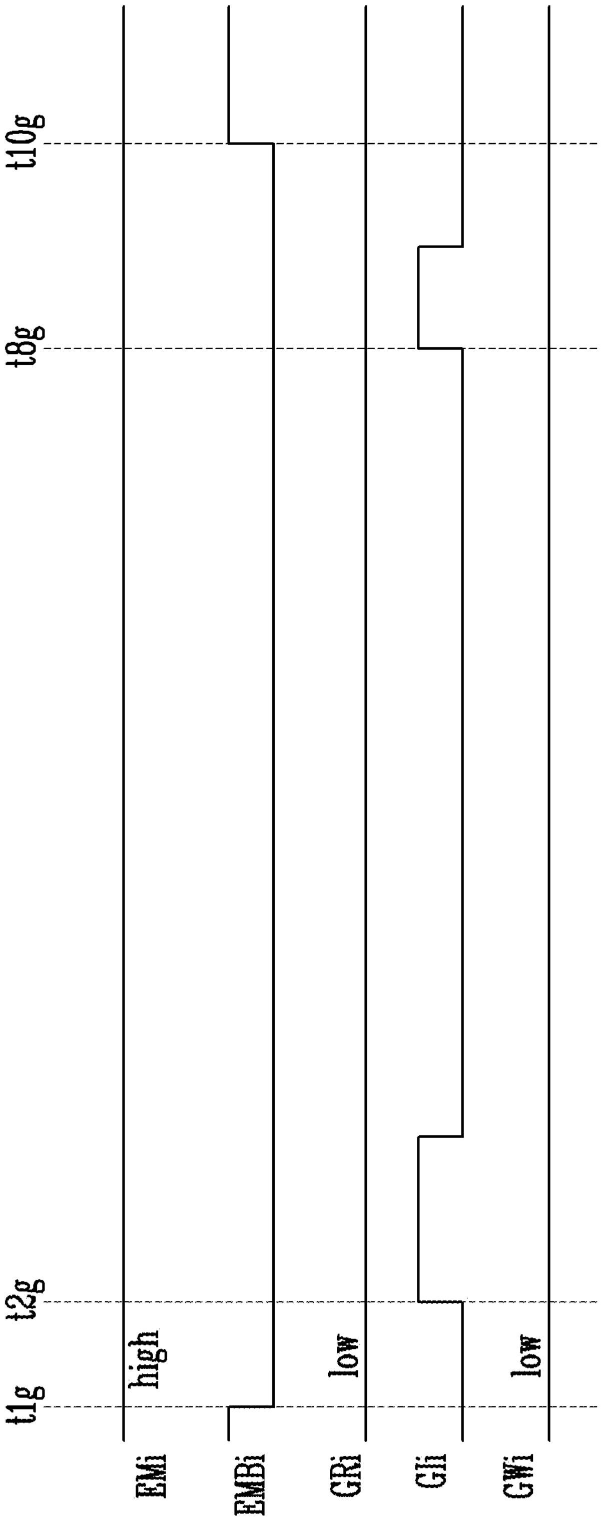

Referring to FIG. 19, time points t1*g*, t2*g*, t8*g*, and t10*g* of a self-scan period SSg may correspond to the time points t1*b* to t10*b* of the self-scan period SSc shown in FIG. 11. The self-scan period SSg shown in FIG. 19 may be substantially identical to the self-scan period SSc shown in FIG. 11, except that polarities of the first emission signal and the second emission signal are reversed according to a change in polarity of the first emission transistor T5' and the second emission transistor T6'. Therefore, the driving method shown in FIG. 19 may be applicable to the display device 10 shown in FIG. 1 and the display device 10_EMDC shown in FIG. 12.

Figure 20:
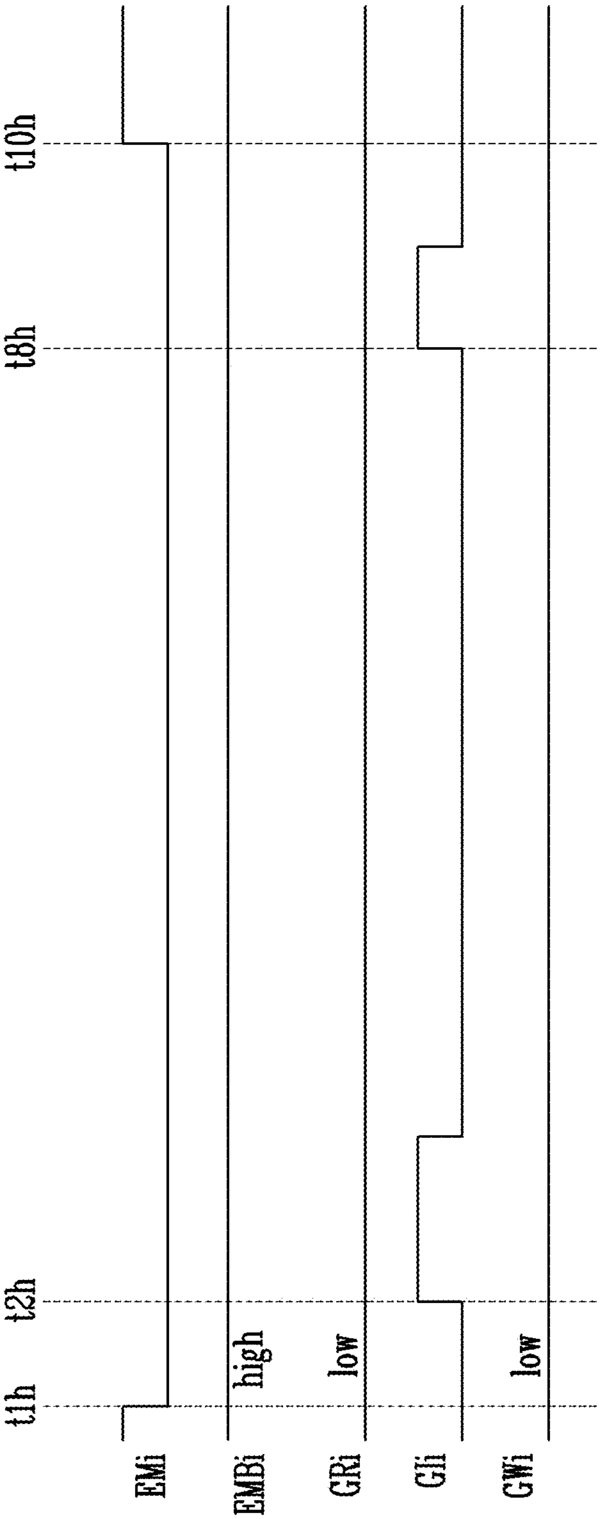

Referring to FIG. 20, time points t1*h*, t2*h*, t8*h*, and t10*h* of a self-scan period SSh may correspond to the time points t1*d* to t10*d* of the self-scan period SSd shown in FIG. 12. The self-scan period SSh shown in FIG. 20 may be substantially identical to the self-scan period SSd shown in FIG. 12, except that polarities of the first emission signal and the second emission signal are reversed according to a change in polarity of the first emission transistor T5' and the second emission transistor T6'. Therefore, the driving method shown in FIG. 20 may be applicable to the display device 10 shown in FIG. 1 and the display device 10_EMBDC shown in FIG. 14.

Figure 21:
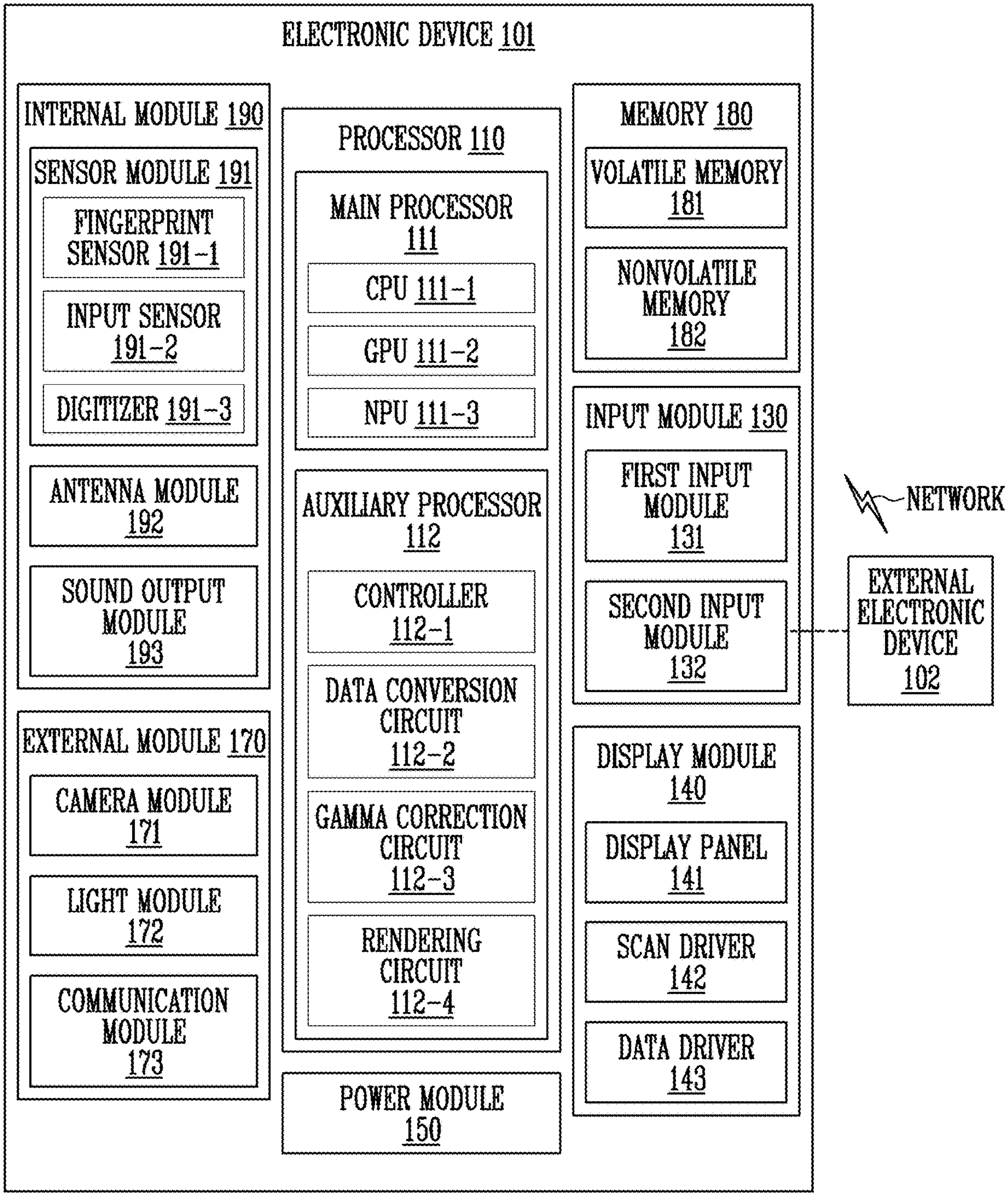
FIG. 21 is a block diagram of an electronic device in accordance with embodiments of the disclosure.

FIG. 21 is a block diagram of an electronic device in accordance with embodiments of the disclosure.

An electronic device 101 may output various information through a display module 140. If a processor 110 executes an application stored in a memory 180, the display module 140 may provide application information to a user through a display panel 141.

The processor 110 may acquire an external input through an input module 130 or a sensor module 191, and execute an application corresponding to the external input. For example, in case that the user selects a camera icon displayed on the display panel 141, the processor 110 may acquire a user input through an input sensor 191-2, and activate a camera module 171. The processor 110 may transfer, to the display module 140, image data corresponding to a photographed image acquired through the camera module 171. The display module 140 may display an image corresponding to the photographed image through the display panel 141.

In another example, in case that personal information authentication is executed in the display module 140, a fingerprint sensor 191-1 may acquire input fingerprint information as input data. The processor 110 may compare the input data acquired through the fingerprint sensor 191-1 with authentication data stored in the memory 180, and execute an application according to a comparison result. The display module 140 may display information executed according to a logic of the application through the display panel 141.

In still another example, in case that a music streaming icon displayed on the display module 140 is selected, the processor 110 may acquire a user input through the input sensor 191-2, and active a music streaming application stored in the memory 180. If a music play command is input in the music streaming application, the processor 110 may activate a sound output module 193, thereby providing the user with sound information which accords with the music play command.

In the above, operations of the electronic device 101 have been briefly described. Hereinafter, components of the electronic device 101 will be described in detail. Some of the components of the electronic device 101, which will be described later, may be integrated to be provided as one component, and one component may be separated into two or more components to be provided.

Referring to FIG. 21, the electronic device 101 may communicate with an external electronic device 102 through a network (e.g., a short-range wireless communication network or a long-range wireless communication network). The electronic device 101 may include the processor 110, the memory 180, the input module 130, the display module 140, a power module 150, an internal module 190, and an external module 170. In the electronic device 101, at least one of the above-described components may be omitted, or one or more other components may be added. Some components (e.g., the sensor module 191, an antenna module 192, and/or the sound output module 193) among the above-described components may be integrated into another component (e.g., the display module 140).

The processor 110 may control at least another component (e.g., a hardware or software component) of the electronic device 101, which is connected to the processor 110, by executing software, and perform various processing or calculations. As at least a portion of the data processing and calculations, the processor 110 may store, in a volatile memory 181, a command or data, received from another component (e.g., the input module 130, the sensor module 191, or a communication module 173), process the command or data, stored in the volatile memory 181, and store result data in a nonvolatile memory 182.

The processor 110 may include a main processor 111 and an auxiliary processor 112. The main processor 111 may include at least one of a central processing unit (CPU) 111-1 or an application processor (AP). The main processor 111 may further include at least one of a graphic processing unit (GPU) 111-2, a communication processor (CP), or an image signal processor (ISP). The main processor 111 may further include a neural processing unit (NPU) 111-3. The NPU 111-3 is a processor specified for processing an artificial intelligence (AI) model, and the AI model may be generated through machine learning. The AI model may include a plurality of artificial neural network layers. An artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-networks, or one of two or more combinations thereof, but the disclosure is not limited to the above-described example. The AI model may additionally or alternatively include a software structure, in addition to a hardware structure. At least two of the above-described processing units and the above-described processors may be implemented into one integrated component (e.g., a single chip), or be implemented as components (e.g., a plurality of chips) independent from each other.

For example, the main processor 111 may provide an input image (or input frame) to the timing controller 11 shown in FIG. 1.

The auxiliary processor 112 may include a controller 112-1. The controller 112-1 may include an interface conversion circuit and a timing control circuit. The controller 112-1 may receive an image signal from the main processor 111, and convert a data format of the image signal to be suitable for interface specifications with the display module 140, thereby outputting image data. The controller 112-1 may output various control signals suitable for driving of the display module 140.

The auxiliary processor 112 may further include a data conversion circuit 112-2, a gamma correction circuit 112-3, a rendering circuit 112-4, and the like. The data conversion circuit 112-2 may receive image data from the controller 112-1, and compensate for the image data such that an image is displayed with a suitable luminance according to a characteristic of the electronic device 101 or a setting of the user or convert the image data for the purpose of reduction of power consumption, afterimage compensation, or the like. The gamma correction circuit 112-3 may convert image data, a gamma reference voltage, or the like such that an image displayed in the electronic device 101 has a suitable gamma characteristic. The rendering circuit 112-4 may receive image data from the controller 112-1, and render the image data by considering a pixel arrangement of the display panel 141, and the like, applied to the electronic device 101. At least one of the data conversion circuit 112-2, the gamma correction circuit 112-3, or the rendering circuit 112-4 may be integrated into another component (e.g., the main processor 111 or the controller 112-1). At least one of the data conversion circuit 112-2, the gamma correction circuit 112-3, or the rendering circuit 112-4 may be integrated into a data driver 143 which will be described later.

The memory 180 may store various data used by at least one component (e.g., the processor 110 or the sensor module 191) of the electronic device 101 and input or output data about a command associated therewith. The memory 180 may include at least one of the volatile memory 181 or the nonvolatile memory 182.

The input module 130 may receive a command or data to be used in a component (e.g., the processor 110, the sensor module 191, or the sound output module 193) of the electronic device 101 from the outside (e.g., the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (e.g., a button), or a pen (e.g., a passive pen or an active pen). The second input module 132 may support a specified protocol capable of connecting the electronic device 101 to the external electronic device 102 by wired or wireless. The second input module 132 may include a high definition multimedia interface (HDMI), a universal serial bus (USB) interface, an SD card interface, or an audio interface. The second input module 132 may include a connector, e.g., an HDMI connector, a USB connector, an SD card connector, or an audio connector (e.g., a headphone connector), which can physically connect the electronic device 101 to the external electronic device 2000.

The display module 140 may visually provide information to the user. The display module 140 may include the display panel 141, a scan driver 142, and the data driver 1143. The display module 140 may further include a window for protecting the display panel 141, a chassis, and a bracket.

The display panel 141 may include a liquid crystal display panel, an organic light-emitting display panel, or an inorganic light-emitting display panel, and the kind of the display panel 141 is not particularly limited. The display panel 141 may be of a rigid type or a flexible type in which the display panel 141 is rollable or foldable. The display module 140 may further include a supporter for supporting the display panel 141, a bracket, a heat dissipation member, or the like.

The scan driver 142 is a driving chip, and may be mounted in the display panel 141. Also, the scan driver 142 may be integrated in the display panel 141. For example, the scan driver 142 may include an Amorphous Silicon TFT Gate (ASG) driver circuit, a Low Temperature Polycrystalline Silicon (LTPS) TFT gate driver circuit, or an Oxide Semiconductor TFT Gate (OSG) driver circuit, which is embedded in the display panel 141. The scan driver 142 may receive a control signal from the controller 112-1, and output scan signals to the display panel 141 in response to the control signal.

The display panel 141 may further include an emission driver. The emission driver may output an emission control signal to the display panel 141 in response to a control signal received from the controller 112-1. The emission driver may separate from the scan driver 142, or be integrated in the scan driver 142.

The data driver 143 may receive a control signal from the controller 112-1, and convert image data into an analog voltage (e.g., a data voltage) and then output data voltages to the display panel 141 in response to the control signal.

The data driver 143 may be integrated in another component (e.g., the controller 112-1). Functions of the interface conversion circuit and the timing control circuit of the controller 112-1, which are described above, may be integrated in the data driver 143.

The display module 140 may further include an emission driver and a voltage generating circuit. The voltage generating circuit may output various voltages suitable for driving the display panel 141.

The power module 150 may supply power to at least one component of the electronic device 101. The power module 150 may include a battery for charging a power voltage. The battery may include a primary cell which is not rechargeable, a secondary cell which is rechargeable, or a fuel cell. The power module 150 may include a power management integrated circuit (PMIC). The PMIC may supply a suitable power source to each of the above-described modules and modules which will be described later. The power module 150 may include a wireless power transmission/reception member electrically connected to the battery. The wireless power transmission/reception member may include a plurality of coil-shaped antenna radiators.

The electronic device 101 may further include the internal module 190 and the external module 170. The internal module 190 may include the sensor module 191, the antenna module 192, and the sound output module 193. The external module 170 may include the camera module 171, a light module 172, and the communication module 173.

The sensor module 191 may sense an input caused by a body of the user or an input caused by a pen in the first input module 131, and generate an electrical signal or a data value, which corresponds to the input. The sensor module 191 may include at least one of the fingerprint sensor 191-1, the input sensor 191-2, or a digitizer 191-3.

The fingerprint sensor 191-1 may generate a data value corresponding to a fingerprint of the user. The fingerprint sensor 191-1 may include any one of an optical type fingerprint sensor or a capacitive type fingerprint sensor.

The input sensor 191-2 may generate a data value corresponding to coordinate information of the input caused by the body of the user or the input caused by the pen. The input sensor 191-2 may generate, as a data value, a capacitance variation caused by the input. The input sensor 191-2 may sense an input caused by a passive pen, or transmit/receive data to/from an active pen.

The input sensor 191-2 may measure a biometric signal, such as pressure, moisture or body fat. For example, in case that the user does not move for a constant time while a body part of the user is in contact with a sensor layer or a sensing panel, the input sensor 191-2 may output information which the user wants to the display module 140 by sensing a biometric signal, based on a change in electric field, caused by the body part.

The digitizer 191-3 may generate a data value corresponding to the coordinate information of the input caused by the pen. The digitizer 191-3 may generate, as a data value, an electromagnetic variation caused by the input. The digitizer 191-3 may sense an input caused by the passive pend, or transmit/receive data to/from the active pen.

At least one of the fingerprint sensor 191-1, the input sensor 191-2, or the digitizer 193-3 may be implemented as a sensor layer on the display panel 141 through a continuous process. At least one of the fingerprint sensor 191-1, the input sensor 191-2, or the digitizer 191-3 may be located at an upper side of the display panel 141, and any one, e.g., the digitizer 191-3 among the fingerprint sensor 191-1, the input sensor 191-2, or the digitizer 191-3 may be located at a lower side of the display panel 141.

At least two of the fingerprint sensor 191-1, the input sensor 191-2, and the digitizer 191-3 may integrated into one sensing panel through the same process. If at least two of the fingerprint sensor 191-1, the input sensor 191-2, or the digitizer 191-3 are integrated into one sensing panel, the sensing panel may be located between the display panel 141 and the window located at an upper side of the display panel 141. The sensing panel may be located on the window, and the position of the sensing panel is not particularly limited.

At least one of fingerprint sensor 191-1, the input sensor 191-2, or the digitizer 191-3 may be built in the display panel 141. That is, at least one of fingerprint sensor 191-1, the input sensor 191-2, or the digitizer 191-3 may be concurrently or substantially simultaneously formed or provided through a process of forming or providing elements (e.g., a light-emitting element, a transistor, and the like) included in the display panel 141.

Besides, the sensor module 191 may generate an electrical signal or a data value, which corresponds to an internal state or an external state of the electronic device 101. The sensor module 191 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 192 may include one or more antennas for transmitting a signal or power to the outside or receiving a signal or power from the outside. The communication module 173 may transmit a signal to the external electronic device or receive a signal from the external electronic device through an antenna suitable for a communication scheme. An antenna pattern of the antenna module 192 may be integrated in one component (e.g., the display panel 141) of the display module 140, the input sensor 191-2, or the like.

The sound output module 193 is a device for outputting a sound signal to the outside of the electronic device 101, and include, for example, a speaker used for a general purpose, such as multimedia playback or transcription playback and a receiver used for only call reception. The receiver may be integral with the speaker or separate from the speaker. A sound output pattern of the sound output module 193 may be integrated in the display module 140.

The camera module 171 may photograph a still image and moving images. The camera module 171 may include one or more lenses, an image sensor, or an image signal processor. The camera module 171 may further include an infrared camera capable of measuring existence of the user, a position of the user, eyes of the user, or the like.

The light module 172 may provide light. The light module 172 may include a light-emitting diode or a xenon lamp. The light module 172 may operate in linkage with the camera module 171 or operate independently from the camera module 171.

The communication module 173 may establish a wired or wireless communication channel between the electronic device 101 and the external electronic device 102, and support communication performance through the established communication channel. The communication module may include any one or all of a wireless communication module, such as a cellular communication module, a short-range wireless communication module, or a global navigation satellite system (GNSS) communication module, and a wired communication module, such as a local area network (LAN) communication module or a power line communication (PLC) module. The communication module 173 may communicate with the external electronic device 102 through a short-range communication network, such as Bluetooth™, wireless-fidelity (WiFi) direct, or infrared data association (IrDA), or a long-range communication network, such as a cellular network, Internet, or a computer network (e.g., LAN or wide area network (WAN)). The above-described several kinds of communication modules may be implemented into one chip or be respectively implemented as separate chips.

The input module 130, the sensor module 191, the camera module 171, and the like may be used to control an operation of the display module 140 in linkage with the processor 110.

The processor 110 may output a command or data to the display module 140, the sound output module 193, the camera module 171, or the light module 172, based on input data received from the input module 130. For example, the processor 110 may generate image data, corresponding to input data applied through a mouse, an active pen, or the like, and output the image data to the display module 140. Alternatively, the processor 110 may generate command data, corresponding to the input data, and output the command data to the camera module 171 or the light module 172. If no input data is received from the input module 130, the processor 110 may change the operation mode of the electronic device 101 to a low power mode or a sleep mode, thereby reducing power consumed in the electronic device 101.

The processor 110 may output a command or data to the display module 140, the sound output module 193, the camera module 171, or the light module 172, based on sensing data received from the sensor module 191. For example, the processor 110 may compare authentication data applied by the fingerprint sensor 191-1 with authentication data stored in the memory 180, and then execute an application according to a comparison result. The processor 110 may execute a command or output corresponding image data to the display module 140, based on sensing data sensed by the input sensor 191-2 or the digitizer 191-3. If a temperature sensor is included in the sensor module 191, the processor 110 may receive temperature data about a temperature measured from the sensor module 191, and further perform luminance correction on image data, based on the temperature data.

The processor 110 may receive measurement data about existence of the user, a position of the user, eyes of the user, or the like from the camera module 171. The processor 110 may further perform luminance correction on image data, based on the measurement data. For example, the processor 110 which decides the existence of the user through an input from the camera module 171 may output image data of which luminance is corrected to the display module 140 through the data conversion circuit 112-2 or the gamma correction circuit 112-3.

At least some of the above-described components may be connected to each other and communicate signals (e.g., commands or data) therebetween through an inter-peripheral communication scheme, e.g., a bus, a general purpose input/output (GPIO), a serial peripheral interface (SPI), a mobile industry processor interface (MIPI), or an ultra path interconnect (UPI) link. The processor 110 may communicate with the display module 140 through an appointed interface, and use any one of the above-described communication schemes. However, the disclosure is not limited to the above-described communication schemes.

The electronic device 101 in accordance with various embodiments disclosed in this document may become various types devices. The electronic device 101 may include, for example, at least one of a portable communication device (e.g., a smartphone), a computer device, a portable multimedia device, a portable medical device, a camera, a wearable device, or a home appliance. The electronic device 101 in accordance with one or more embodiments of this document is not limited to the above-described devices.

In the pixel, the display device, and the electronic device in accordance with the embodiments of the disclosure, the number of suitable clock signals can be reduced or minimized.

Example embodiments have been disclosed herein, and although specific and general terms are employed, they are used and are to be interpreted in a generic and descriptive sense only and not for purpose of limitation. In some instances, as would be apparent to one of ordinary skill in the art as of the filing of the application, aspects described in connection with any embodiment may be used singly or in combination with aspects described in connection with other embodiments unless otherwise specifically indicated. Accordingly, it will be understood by those of skill in the art that various changes in form and details may be made without departing from the spirit and scope of the disclosure as set forth in the following claims, with functional equivalents thereof to be included therein.

What is claimed is:

1. A display device comprising:

pixels comprising:

a light-emitting element configured to emit light based on a driving current;

a first transistor configured to control an amount of the driving current, based on a data voltage;

a second transistor configured to receive the data voltage from a data line, and to receive a first scan signal having a turn-on level;

a first emission transistor connected between a first power line and the first transistor, and comprising a gate electrode for receiving a first emission signal; and a second emission transistor connected between the first transistor and the light-emitting element, and comprising a gate electrode for receiving a second emission signal, wherein the first emission transistor and the second emission transistor are configured to be turned off once or more, and the second transistor is configured to receive the first scan signal having a turn-on level, during an address scan period, and wherein the first scan signal having a turn-off level is maintained, one of the first emission transistor or the second emission transistor is configured to be turned off once or more, and another of the first emission transistor or the second emission transistor is configured to maintain a turn-on state, during a self-scan period.

2. The display device of claim 1, wherein a waveform of the first emission signal during the address scan period, and a waveform of the first emission signal during the self-scan period, are different, and wherein a waveform of the second emission signal during the address scan period, and a waveform of the second emission signal during the self-scan period, are different.

3. The display device of claim 2, wherein a time length for which supply of the driving current to the light-emitting element is suspended during the address scan period is equal to a time length for which supply of the driving current to the light-emitting element is suspended during the self-scan period.

4. The display device of claim 3, wherein the pixels further comprise an initialization transistor connected between an initialization voltage line and an anode electrode of the light-emitting element, and comprising a gate electrode for receiving a second scan signal.

5. The display device of claim 4, wherein a waveform of the second scan signal during the address scan period, and a waveform of the second scan signal during the self-scan period, are the same.

6. The display device of claim 5, wherein the pixels further comprise a reference transistor connected between a reference voltage line and a gate electrode of the first transistor, and comprising a gate electrode for receiving a third scan signal.

7. The display device of claim 6, wherein a waveform of the third scan signal during the address scan period, and a waveform of the third scan signal during the self-scan period, are different.

8. The display device of claim 7, wherein a turn-on level of the first emission signal is maintained, and the second emission signal comprises a pulse of a turn-off level, during the self-scan period.

9. The display device of claim 8, further comprising:

a first emission driver configured to provide the first emission signal;

a second emission driver configured to provide the second emission signal;

a first scan driver configured to provide the first scan signal;

a second scan driver configured to provide the second scan signal; and a third scan driver configured to provide the third scan signal, wherein the first emission driver and the third scan driver share same clock signals of a first group.

10. The display device of claim 9, wherein the second emission driver and the second scan driver share same clock signals of a second group.

11. The display device of claim 10, wherein the clock signals of the first group and the clock signals of the second group are different.

12. The display device of claim 7, wherein the first emission signal comprises a pulse of a turn-off level, and a turn-on level of the second emission signal is maintained, during the self-scan period.

13. The display device of claim 12, further comprising:

a first emission driver configured to provide the first emission signal;

a second emission driver configured to provide the second emission signal;

a first scan driver configured to provide the first scan signal;

a second scan driver configured to provide the second scan signal; and a third scan driver configured to provide the third scan signal, wherein the first emission driver and the second scan driver share same clock signals of a first group.

14. The display device of claim 13, wherein the second emission driver and the third scan driver share same clock signals of a second group.

15. The display device of claim 14, wherein the clock signals of the first group and the clock signals of the second group are different.

16. An electronic device comprising:

a processor configured to provide an input frame;

a data driver configured to generate data voltages using grayscales for the input frame; and pixels configured to display an image using the data voltages, the pixels comprising:

a light-emitting element configured to emit light based on a driving current;

a first transistor configured to control an amount of the driving current, based on a data voltage;

a second transistor configured to receive the data voltage from a data line, and to receive a first scan signal having a turn-on level;

a first emission transistor connected between a first power line and the first transistor, and comprising a gate electrode for receiving a first emission signal; and a second emission transistor connected between the first transistor and the light-emitting element, and comprising a gate electrode for receiving a second emission signal, wherein the first emission transistor and the second emission transistor are configured to be turned off once or more during an address scan period in which the first scan signal having a turn-on level is received, and wherein one of the first emission transistor or the second emission transistor is configured to be turned off once or more, and another of the first emission transistor or the second emission transistor is configured to maintain a turn-on state, during a self-scan period in which the first scan signal having a turn-off level is maintained.

17. The electronic device of claim 16, wherein a waveform of the first emission signal during the address scan period, and a waveform of the first emission signal during the self-scan period, are different, and wherein a waveform of the second emission signal during the address scan period, and a waveform of the second emission signal during the self-scan period, are different.

18. The electronic device of claim 17, wherein a time length for which supply of the driving current to the light-emitting element is suspended during the address scan period is equal to a time length for which supply of the driving current to the light-emitting element is suspended during the self-scan period.

19. The electronic device of claim 18, wherein the pixels further comprise an initialization transistor connected between an initialization voltage line and an anode electrode of the light-emitting element, and comprising a gate electrode for receiving a second scan signal, and wherein a waveform of the second scan signal during the address scan period, and a waveform of the second scan signal during the self-scan period, are the same.

20. The electronic device of claim 19, wherein the pixels further comprise a reference transistor connected between a reference voltage line and a gate electrode of the first transistor, and comprising a gate electrode for receiving a third scan signal, and wherein a waveform of the third scan signal during the address scan period, and a waveform of the third scan signal during the self-scan period, are different.

* * * * *